(12) United States Patent
Korenblum et al.

(10) Patent No.: US 12,458,274 B2
(45) Date of Patent: Nov. 4, 2025

(54) CLASSIFICATION OF EPILEPTIC AND NON-EPILEPTIC PHENOTYPES FROM EEG RECORDINGS AND RELATED CLOSED-LOOP APPLICATIONS

(71) Applicant: Encephalogix, Inc., Orinda, CA (US)

(72) Inventors: Daniel Korenblum, San Francisco, CA (US); Thadd C. Reeder, Medford, OR (US)

(73) Assignee: Encephalogix, Inc., Orinda, CA (US)

( * ) Notice: Subject to any disclaimer, the term of this patent is extended or adjusted under 35 U.S.C. 154(b) by 0 days.

(21) Appl. No.: 18/587,636

(22) Filed: Feb. 26, 2024

(65) Prior Publication Data
US 2024/0285221 A1 Aug. 29, 2024

Related U.S. Application Data

(60) Provisional application No. 63/448,795, filed on Feb. 28, 2023.

(51) Int. Cl.
*A61B 5/372* (2021.01)
*A61B 5/00* (2006.01)
(Continued)

(52) U.S. Cl.
CPC ............ *A61B 5/372* (2021.01); *A61B 5/4094* (2013.01); *A61B 5/4836* (2013.01);
(Continued)

(58) Field of Classification Search
CPC ..... A61B 5/372; A61B 5/4094; A61B 5/4836; A61B 5/7267; A61B 5/165; A61B 5/291;
(Continued)

(56) References Cited

U.S. PATENT DOCUMENTS 7,299,088 B1 * 11/2007 Thakor ................ A61B 5/4094
600/544
11,742,076 B2 * 8/2023 Banerjee ................... G06N 3/08
706/25
(Continued)

FOREIGN PATENT DOCUMENTS

CN 107479685 A * 12/2017

OTHER PUBLICATIONS

Lin, Chinese Patent Document CN 107479685 A—translation provided by Clarivate Analytics (Year: 2017).*
(Continued)

*Primary Examiner* — Jennifer Robertson
*Assistant Examiner* — Jonathan Drew Moroneso
(74) *Attorney, Agent, or Firm* — Van Pelt, Yi & James LLP

(57) ABSTRACT

A detection function is used to detect an event in an electroencephalogram (EEG) signal in order to generate a plurality of detected events. For each detected event in the plurality of detected events, a plurality of features from the EEG signal is measured in order to obtain a measured feature vector, where the plurality of features is defined by a feature space corresponding to the event and a measured feature space includes a plurality of measured feature vectors corresponding to a plurality of labeled points having locations. The EEG signal is classified based at least in part on the locations of the plurality of labeled points in the measured feature space.

18 Claims, 13 Drawing Sheets

(51) Int. Cl.

| | |
|---|---|
| *A61B 5/291* | (2021.01) |
| *A61B 5/31* | (2021.01) |
| *A61B 5/369* | (2021.01) |
| *A61N 1/36* | (2006.01) |
| *G06F 3/01* | (2006.01) |
| *G06N 3/02* | (2006.01) |
| *G06N 20/00* | (2019.01) |
| *H04L 41/16* | (2022.01) |
| *A61B 5/16* | (2006.01) |
| *A61B 5/374* | (2021.01) |
| *G06N 20/10* | (2019.01) |
| *G06N 20/20* | (2019.01) |
| *G06N 99/00* | (2019.01) |

(52) U.S. Cl.
CPC ............ *A61B 5/7267* (2013.01); *A61B 5/165* (2013.01); *A61B 5/291* (2021.01); *A61B 5/31* (2021.01); *A61B 5/369* (2021.01); *A61B 5/374* (2021.01); *A61B 5/72* (2013.01); *A61B 5/7235* (2013.01); *A61B 5/7264* (2013.01); *A61B 5/7275* (2013.01); *A61N 1/36064* (2013.01); *G06F 3/015* (2013.01); *G06N 3/02* (2013.01); *G06N 20/00* (2019.01); *G06N 20/10* (2019.01); *G06N 20/20* (2019.01); *G06N 99/00* (2013.01); *H04L 41/16* (2013.01)

(58) Field of Classification Search
CPC ........... A61B 5/31; A61B 5/369; A61B 5/374; A61B 5/72; A61B 5/7235; A61B 5/7264; A61B 5/7275; A61N 1/36064; G06F 3/015; G06N 3/02; G06N 20/00; G06N 20/10; G06N 20/20; G06N 99/00; H04L 41/16
See application file for complete search history.

(56) References Cited

U.S. PATENT DOCUMENTS

| | | | | |
|---|---|---|---|---|
| 2003/0052775 | A1* | 3/2003 | Shambroom | A61B 5/369 600/300 |
| 2004/0133120 | A1* | 7/2004 | Frei | A61B 5/374 128/920 |
| 2011/0257517 | A1* | 10/2011 | Guttag | A61B 5/7207 600/431 |
| 2016/0029946 | A1* | 2/2016 | Simon | A61B 5/7203 600/544 |
| 2016/0045128 | A1* | 2/2016 | Sitt | A61B 5/316 600/475 |
| 2019/0224481 | A1* | 7/2019 | Wingeier | A61B 5/378 |
| 2021/0267551 | A1* | 9/2021 | Zhu | A61B 5/7246 |
| 2023/0200741 | A1* | 6/2023 | Olivatto Fioravanti | A61B 5/721 600/301 |
| 2023/0389856 | A1* | 12/2023 | Heasman | A61B 5/4839 |

OTHER PUBLICATIONS

Dimitrov et al., "Sleep spindles comprise a subset of a broader class of electroencephalogram events", SLEEPJ, vol. 44, No. 9, 1-15, published Apr. 15, 2021 (Year: 2021).*
Altinay et al., A Comprehensive Review of the Use of Deep Brain Stimulation (DBS) in Treatment of Psychiatric and Headache Disorders, Headache, 2015, pp. 345-350.
Author Unknown, Bayes Classifier, Wikipedia, Jun. 23, 2022.
Baldin et al., Yield of Epileptiform Electroencephalogram Abnormalities in Incident Unprovoked Seizures: a Population-Based Study, Epilepsia, 2014, pp. 1389-1398, vol. 55, No. 9.
C.E. Shannon, a Mathematical Theory of Communication, Mobile Computing and Communications Review, 1948, vol. 5, No. 1, pp. 3-55.
Cascino et al., Epilepsy, 2021.
Christopher M. Bishop, Pattern Recognition and Machine Learning, 2006.
Conrad et al., Spatial Distribution of Interictal Spikes Fluctuates Over Time and Localizes Seizure Onset, Brain 2020, 2020, pp. 554-569.
Durbin et al., Biological Sequence Analysis: Probabilistic Models of Proteins and Nucleic Acids, 1998.
Edwards et al., Neurostimulation Devices for the Treatment of Neurologic Disorders, Mayo Clinic Proceedings, Sep. 2017, pp. 1427-1444, vol. 92, No. 9.
Galhardoni et al., Repetitive Transcranial Magnetic Stimulation in Chronic Pain: a Review of the Literature, Archives of Physical Medicine and Rehabilitation, 2015, pp. S156-S172.
Karoly et al., Cycles in Epilepsy, Nature Reviews Neurology, May 2021, pp. 267-284, vol. 17.
Karoly et al., Interictal Spikes and Epileptic Seizures: Their Relationship and Underlying Rhythmicity, Brain 2016, 2016, pp. 1066-1078.
Lehn et al., Psychogenic Nonepileptic Seizures Treated as Epileptic Seizures in the Emergency Department, Epilepsia, 2021.
Ma et al., Responsive Neurostimulation: Candidates and Considerations, Epilepsy & Behavior 88, 2018, pp. 388-395.
Obeid et al., The Temple University Hospital EEG Data Corpus, Frontiers in Neuroscience, May 2016, vol. 10, Article 196.
Paul Van Der Laken, ROC, AUC, Precision, and Recall Visually Explained, paulvanderlaken.com, 2019.
Sanei et al., EEG Signal Processing, 2007.
Stanslaski et al., Design and Validation of a Fully Implantable, Chronic, Closed-Loop Neuromodulation Device With Concurrent Sensing and Stimulation, IEEE Transactions on Neural Systems and Rehabilitation Engineering, Jul. 2012, vol. 20, No. 4, pp. 410-421.
Thangavel et al., Improving Automated Diagnosis of Epilepsy from EEGs Beyond IEDs, Journal of Neural Engineering, 2022.
Tom Fawcett, An Introduction to ROC Analysis, Pattern Recognition Letters 27, 2006, pp. 861-874.
Urbach et al., "Within a Minute" Detection of Focal Cortical Dysplasia, Neuroradiology, 2022, pp. 715-726.
Violante et al., Non-Invasive Temporal Interference Electrical Stimulation of the Human Hippocampus, Nature Neuroscience, 2023.
Agrawal et al., Yield of Monitoring in an Adult Epilepsy Monitoring Unit (P2.097), Neurology, Apr. 2015.

* cited by examiner

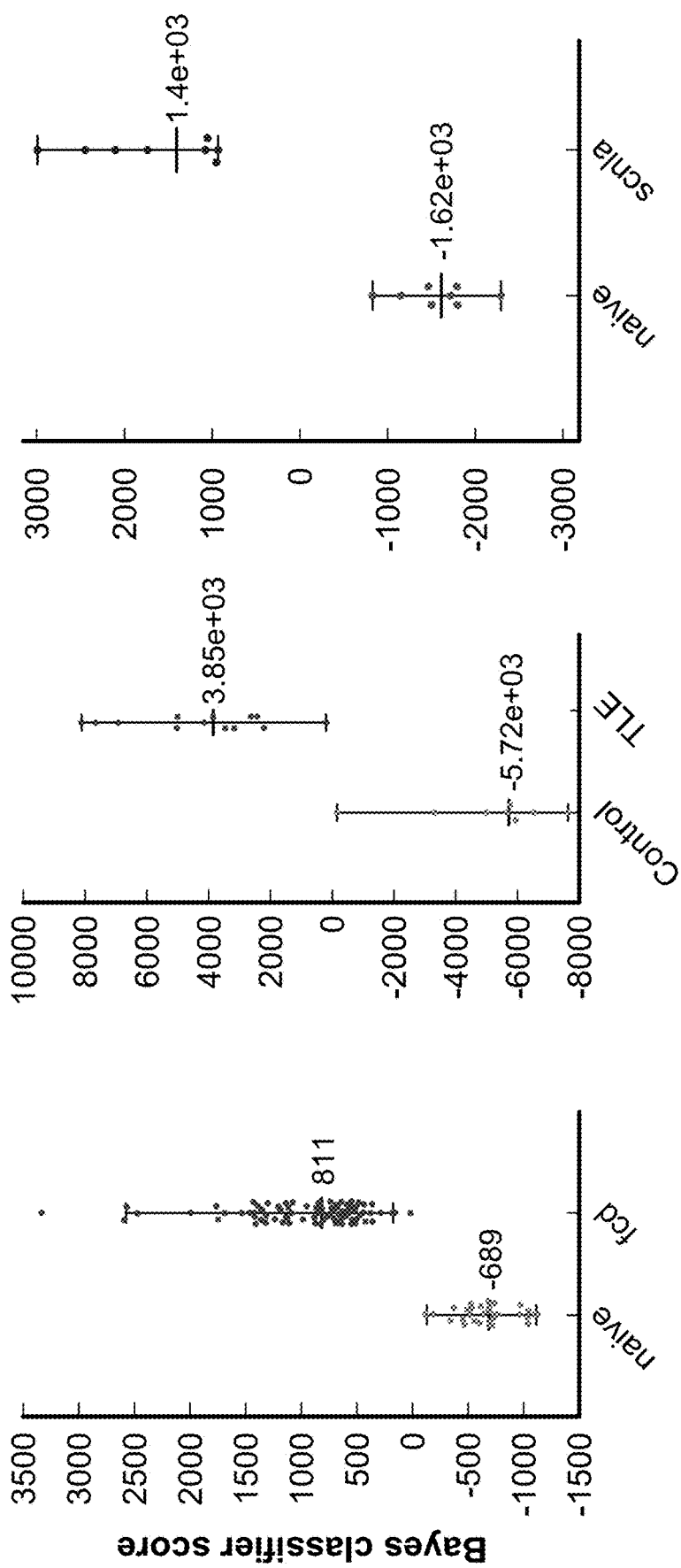

CLASSIFICATION OF EPILEPTIC AND NON-EPILEPTIC PHENOTYPES FROM EEG RECORDINGS AND RELATED CLOSED-LOOP APPLICATIONS

CROSS REFERENCE TO OTHER APPLICATIONS

This application claims priority to U.S. Provisional Patent Application No. 63/448,795 entitled CLASSIFICATION OF EPILEPTIC AND NON-EPILEPTIC PHENOTYPES FROM EEG RECORDINGS filed Feb. 28, 2023 which is incorporated herein by reference for all purposes.

BACKGROUND OF THE INVENTION

Epilepsy is currently diagnosed primarily through the direct observation of seizures. As seizures can occur due to conditions other than epilepsy, electroencephalographic (EEG) recording data is also used to diagnose epilepsy. Seizure activity typically presents in EEG recordings as a series of rapid and large changes in the electrical field that last from tens to hundreds of seconds. If these events happen during the recording period, they can confirm the diagnosis of epilepsy. However, this diagnosis technique is dependent upon seizure activity occurring during an EEG recording session. New techniques for diagnosing epilepsy which are not dependent upon the concurrence of seizure activity and an EEG recording session would be desirable. Furthermore, it would be desirable if such techniques could be performed in a manner that efficiently uses (e.g., processor and/or CPU) computational resources.

BRIEF DESCRIPTION OF THE DRAWINGS

Various embodiments of the invention are disclosed in the following detailed description and the accompanying drawings.

FIG. 7A shows an example of focal cortical dysplasia (rat model, N=116).

FIG. 7B shows an example of Temporal Lobe Epilepsy (rat model, N=21).

FIG. 7C shows an example of Dravet syndrome (mouse model, N=16).

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
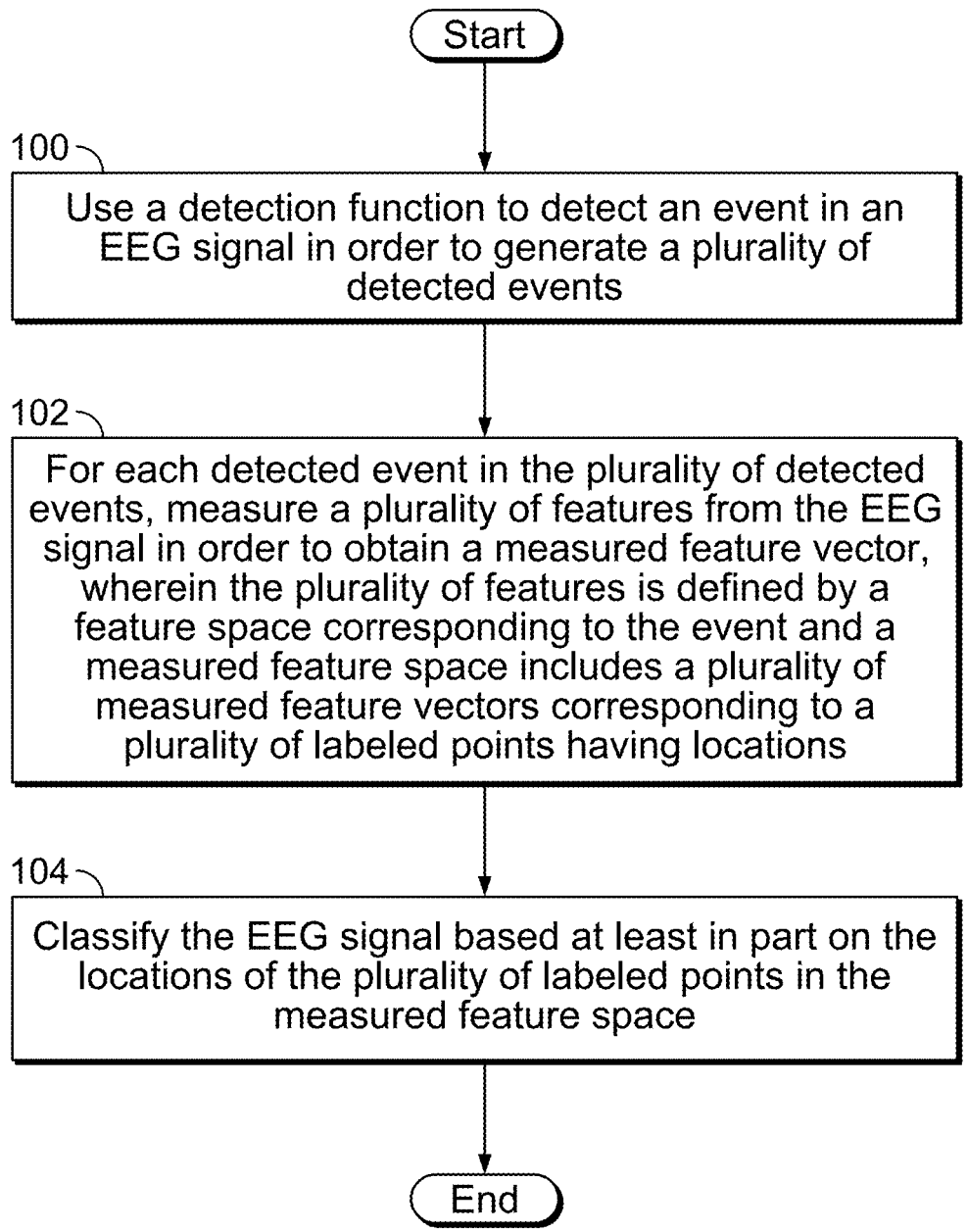
FIG. 1 shows one embodiment of such a process to determine whether an EEG signal corresponds to an epileptic state.

Various embodiments of a technique to determine whether an EEG signal corresponds to an epileptic state (e.g., a diagnosis of epilepsy, a degree of epilepsy, etc.) are described herein. FIG. 1 shows one embodiment of such a process to determine whether an EEG signal corresponds to an epileptic state.

At 100, a detection function is used to detect an event in an EEG signal in order to generate a plurality of detected events. In one example, the detection function is configured to detect a peak shape (e.g., a local maximum) in the EEG signal. In one example, the output of step 100 is the time indices of the EEG signal where a peak was detected by the detection function (e.g., $t_{peak\_1}, t_{peak\_2}, \ldots, t_{peak\_n}$).

In the above example, a single shape (i.e., a peak) is detected but in some other embodiments, multiple detection functions are used where each detection function is configured to detect a different type of event (e.g., a different type of shape) in the EEG signal.

At 102, for each detected event in the plurality of detected events, a plurality of features is measured from the EEG signal in order to obtain a measured feature vector, wherein the plurality of features is defined by a feature space corresponding to the event and a measured feature space includes a plurality of measured feature vectors corresponding to a plurality of labeled points having locations.

To continue the example from above where peaks are detected in the EEG signal, suppose that the feature space corresponding to a peak includes (at least in this example): amplitude (e.g., the amplitude of a given peak), prominence (e.g., how much a given peak "sticks up" relative to its neighbors), and duration (e.g., how long a given peak lasts). In one example of how step 102 is performed, for the first detected event (i.e., at time index $t_{peak\_1}$), a processor goes back to the EEG signal at and/or around the time index of $t_{peak\_1}$ and measures or otherwise calculates a first measured feature vector having values of [$amplitude_{peak\_1}$, $prominence_{peak\_1}$, and $duration_{peak\_1}$] based on the voltage levels of the EEG signal at and/or around the time index of $t_{peak\_1}$. Then, for a second detected event (i.e., at time index $t_{peak\_2}$), a second measured feature vector having values of [$amplitude_{peak\_2}$, $prominence_{peak\_2}$, and $duration_{peak\_2}$] is determined or otherwise measured. This continues for all detected events to produce a measured feature space comprising: [$amplitude_{peak\_1}$, $prominence_{peak\_1}$, and $duration_{peak\_1}$]; [$amplitude_{peak\_2}$, $prominence_{peak\_2}$, and $duration_{peak\_2}$]; . . . ; [$amplitude_{peak\_n}$, $prominence_{peak\_n}$, and $duration_{peak\_n}$].

It is noted that other types of events (e.g., other types of shapes) may have different feature spaces (e.g., a different set of features for a given shape). Also, the features in a feature space are not necessarily of the same length and/or (e.g., time index) duration. For example, amplitude and prominence are associated with single time indices, whereas duration are is associated with multiple time indices, with a variable number from peak to peak.

As used herein, the term "measured feature space" is used to differentiate the measured or otherwise extracted values based on a given or specific EEG signal compared to the general characteristics, qualities, or features in a "feature space" that are not specific to otherwise based on a single, specific EEG signal.

Figure 2:
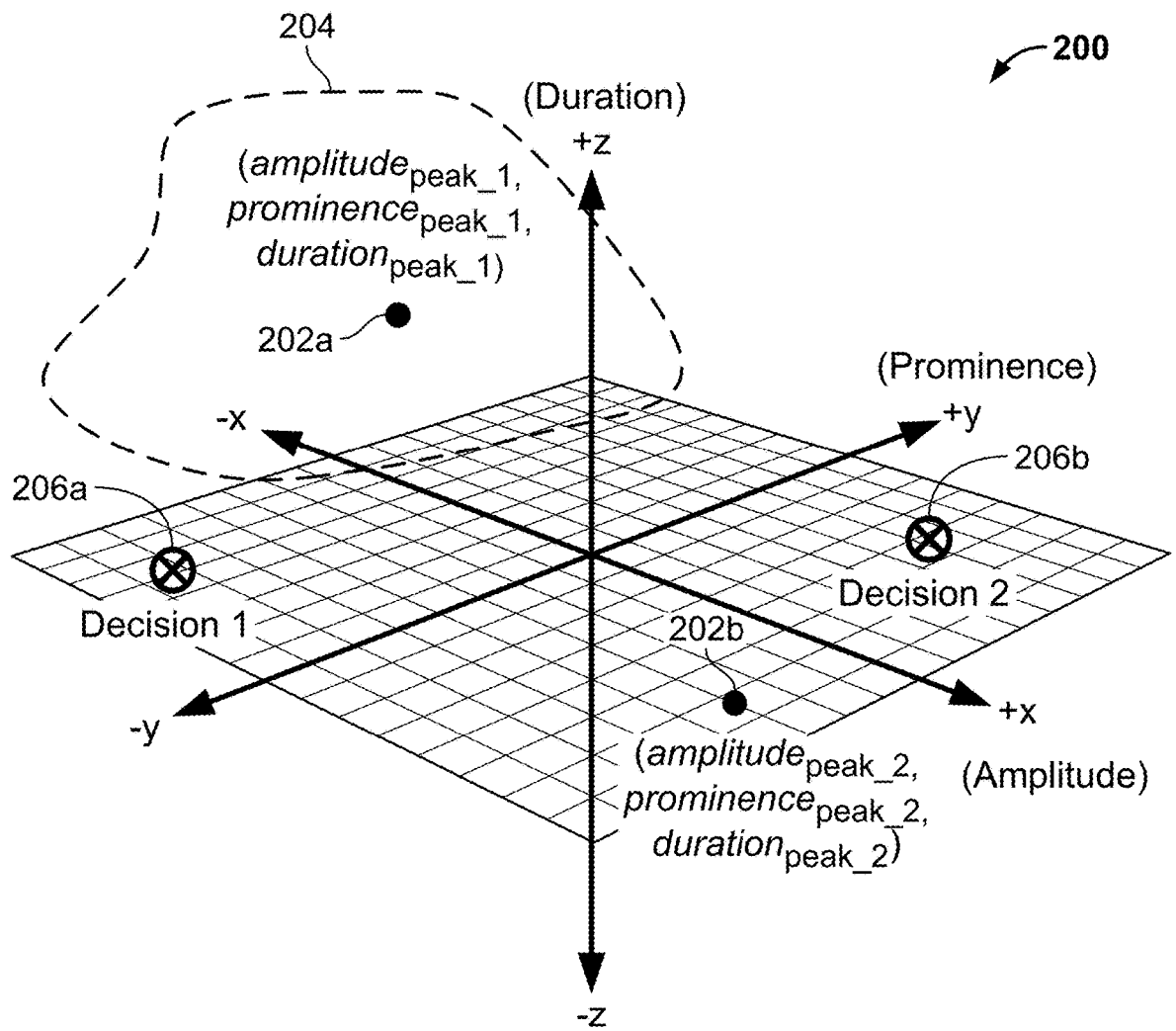
FIG. 2 shows an embodiment of a 3D graph with labeled points corresponding to measured feature vectors that include amplitude, prominence, and duration.

Each measured feature vector corresponds to and/or can be represented as a labeled point. FIG. 2 shows an embodiment of a 3D graph with labeled points corresponding to measured feature vectors that include amplitude, prominence, and duration. In this example, a 3D graph (200) is shown where the x-axis corresponds to amplitude, the y-axis corresponds to prominence, and the z-axis corresponds to duration. Each measured feature vector in this example is a "triplet" having an amplitude, prominence, and duration value. To illustrate the technique, two exemplary labeled points (202a and 202b) are plotted at the appropriate positions or locations (e.g., given their values) within the exemplary 3D graph. The first labeled point (202a) corresponds to a first measured feature vector (i.e., [$amplitude_{peak\_1}$, $prominence_{peak\_1}$, and $duration_{peak\_1}$]) and the second labeled point (202b) corresponds to a second measured feature vector (i.e., [$amplitude_{peak\_2}$, $prominence_{peak\_2}$, and $duration_{peak\_2}$]). For brevity and to preserve the readability of the diagram, additional labeled points corresponding to the remaining measured feature vectors are not shown.

Returning to FIG. 1, at 104, the EEG signal is classified based at least in part on the locations of the plurality of labeled points in the measured feature space.

In some embodiments, the classification at step 104 is done using probabilistic and/or statistical techniques, such as (non-machine learning) Bayesian statistical techniques. (It is noted that a Bayes classifier is a machine learning technique, not be confused with (non-machine learning) Bayesian statistics, which is an alternative approach to defining probability compared to classical and/or frequentist statistics; Bayesian statistics defines probability in terms of belief of an outcome, not in terms of an observed frequency of an event.) For example, the 3D space shown in diagram 200 in FIG. 2 may be divided up into non-overlapping (i.e., totally disjoint) 3D regions or measurable topologically-connected subsets (MTCSs) (e.g., one of which is shown as region 204) which may be assigned a probability (e.g., of epilepsy) or in some cases no probability (e.g., where labeled point(s) that fall into such regions are ignored or otherwise not considered). For those labeled points (e.g., 202a and 202b) that fall into a region or MTCS with a probability, the probabilities are combined and the combined value is used to perform the classification. As will be described in more detail below, the Waveform Shape Analysis (WSA) technique is one way in which a measured feature space can be divided up into different MTCSs; the WSA technique may also be used to calculate the probabilities that are assigned to at least some of the MTCSs and/or decide which MTCSs are not assigned a probability (i.e., what are the boundaries of an acceptance region, where labeled points that fall outside of the acceptance region are ignored or otherwise discounted and no probability is assigned outside of the acceptance region). In general, feature spaces of any dimension that are discretized into non-overlapping (i.e., totally disjoint) MTCSs can be referred to as being "appropriately discretized."

Alternatively, in some other embodiments, the classification at step 104 is performed using distance-based techniques, such as nearest neighbor. For example, in FIG. 2, a first decision (or classification) (206a) is shown as a first point within the 3D space and a second decision (or classification) (206b) is shown as a second point within the 3D space. In one example, each labeled point (e.g., 202a and 202b) is mapped to its nearest neighbor (e.g., 206a or 206b) and the mapped-to nearest neighbors are combined and/or are otherwise used to make the classification.

The term "labeled point" is used to specify or clearly illustrate that the points (and correspondingly, the measured feature vectors) are labeled or otherwise annotated so that which value corresponds to which feature is known. For example, the classifier (or, more generally, a processor) at step 104 knows that the first value in the triplet (or other n-dimensional vector) corresponds to the amplitude, the second value in the triplet corresponds to the prominence, and so on. If unlabeled points were instead used, then the classifier (or other processor) would not know which value corresponded to which feature and decision making and/or processing (e.g., at step 104 and/or elsewhere) would be difficult or impossible.

One benefit and/or attractive feature of the technique described in FIG. 1 is that it uses (e.g., processor and/or computer) resources in an efficient manner (or at least more efficient than some other techniques). For example, an EEG signal may be relatively large with many time indices and multiple channels (e.g., where each channel corresponds to a different probe). As described above, in some embodiments, the output of step 100 is the time indices at which events were detected, which is a relatively small amount of information to store. Similarly, the feature measurement step at 102 and classification at 104 would only occur for the time indices where an event was detected, and so only a relatively small amount of resources would be required.

In some embodiments, the process of FIG. 1 includes (e.g., in one or more of the steps shown) converting a vector time series into a symbolic sequence format, wherein a symbolic alphabet associated with the symbolic sequence format is defined by a trained supervised machine learning model or classifier in terms of measurable topologically connected subsets (e.g., of a waveform shape feature space). In some embodiments, the process of FIG. 1 further includes (e.g., in one or more of the steps shown) using a vector time series that has been converted into a symbolic sequence using a machine learning as a model of system dynamics, allowing estimation of system state and modeling of the system dynamics in terms of symbolic sequences.

Figure 3A:
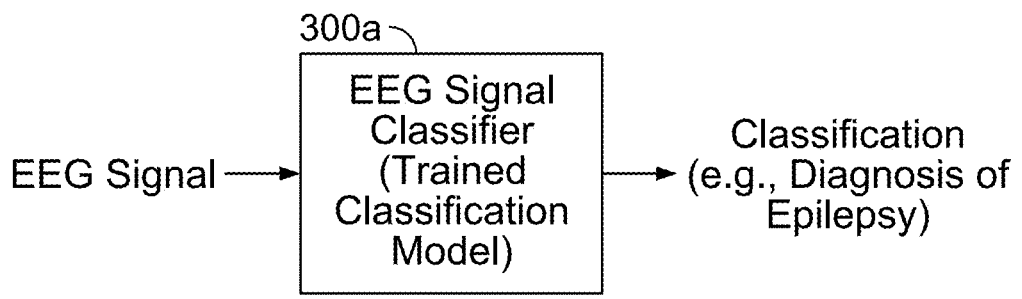
FIG. 3A shows an embodiment of a trained classification model that is used as an EEG signal classifier.

FIG. 3A shows an embodiment of a trained classification model that is used as an EEG signal classifier. In this example, an EEG signal is input to an EEG signal classifier (300a) that outputs a classification (e.g., a diagnosis of epilepsy). In this example, the EEG signal classifier is implemented using a trained classification model. This EEG signal classifier (300a) is one example of a processor or system that performs the classification process of FIG. 1. The following figure shows a high-level example of how such a trained classification model may be obtained.

Figure 3B:
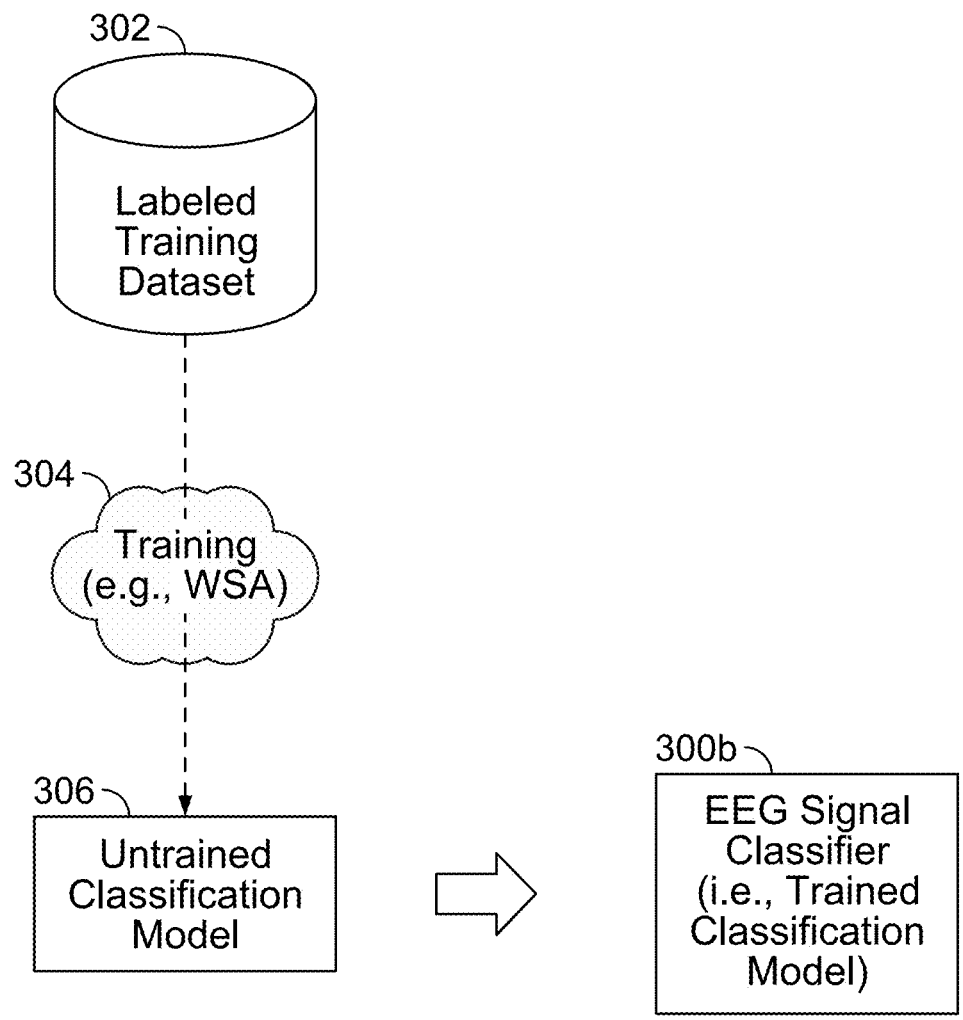
FIG. 3B shows an embodiment of a trained classification model that is obtained using a labeled training dataset.

FIG. 3B shows an embodiment of a trained classification model that is obtained using a labeled training dataset. In this example, a labeled training dataset (302) includes EEG signals that are associated with subjects (e.g., human or animal) that are known to have epilepsy or are known to not have epilepsy (i.e., each EEG sample in the labeled training data set is labeled either "epileptic" or "not epileptic"). A training process (304), such as the aforementioned WSA technique, trains an untrained classification model (306) using the labeled training dataset (302). For example, in FIG. 2, this training process may include defining the boundaries of the various regions (204) as well as any probability or other value associated with that region. Some examples of WSA training are described in more detail below. Returning to FIG. 3B, once training is completed, the untrained classification model (306) is a trained classification model (300b) that can be used as an EEG signal classifier.

Depending upon the application, different techniques for training (and thus, different types of EEG signal classifiers which are produced) may be desirable. For example, although it may be possible to use non-probabilistic machine learning to train an EEG signal classifier, if the application is governed by a regulatory and/or professional organization (e.g., the FDA, American Academy of Neurology, etc.), non-probabilistic machine learning may be unattractive because transparent and/or interpretable techniques are preferred and a non-probabilistic machine learning EEG signal classifier may not necessarily be transparent and/or produce interpretable results. In contrast, probabilistic techniques (e.g., Bayes classifiers and/or WSA) may produce an EEG signal classifier that is transparent and/or produces interpretable results to a medical professional, in terms of a post-test probability of having a disease.

At least some of the embodiments describe herein help to answer the question, "How to define the background in an EEG recording"? In a more general context, this question can be phrased as, "How to separate signal from noise in a (scalar or vector) time series dataset?" Conceptually, the shape detection analysis techniques described herein can be thought of as a technique to separate signal from noise in a time series, in a data driven manner powered by a supervised machine learning classifier (at least in some embodiments), such that each segment of the waveform is assigned a ranking according to how much signal content it contains, with respect to a given classification or detection task. That is, the detected shapes can be used for data-driven waveform segmentation in a way that simultaneously provides a ranking of the resulting waveform segments, in terms of how much signal or noise they contain. This helps to answer the question, "How to best separate signal from noise?"

The following figures discuss training embodiments using the WSA technique in more detail.

Overview

Epilepsy is currently diagnosed primarily through the direct observation of seizures. Epilepsy patients are primarily treated with anti-seizure medicines (ASMs) designed for anti-seizure effects and are currently evaluated mainly using seizure counts. As seizures can occur due to conditions other than epilepsy, electroencephalographic (EEG) recording data are also used to diagnose epilepsy, as well as inform clinicians on prognosis and treatment options. Furthermore, there are epileptic seizure types which do not present any change in observable behavior, such as loss of motor control. EEG is a noninvasive technique for measuring changes in the electrical field of the brain as a function of time.

Electrocorticographic (ECoG) recordings are similar to EEG in their sensing modality, also being extracellular. However, these are distinguished by the invasiveness of the electrodes used, which are placed inside the skull. Similarly, depth electrodes and other implants can be used to obtain electrographic recordings from deep inside a living brain. These are more invasive than EEG and so are less desirable from a clinical standpoint. In some examples described below, EEG signals and/or recordings are described (e.g., since in many applications, non-invasive embodiments are desirable). However, it is noted that the techniques described herein are also applicable to more invasive types of extracellular electrographic recording.

It has been observed that seizure activity presents in EEG recordings as a series of rapid and large changes in the electrical field that last from tens to hundreds of seconds. If these events happen during the recording period, they can confirm the diagnosis of epilepsy.

Figure 4A:
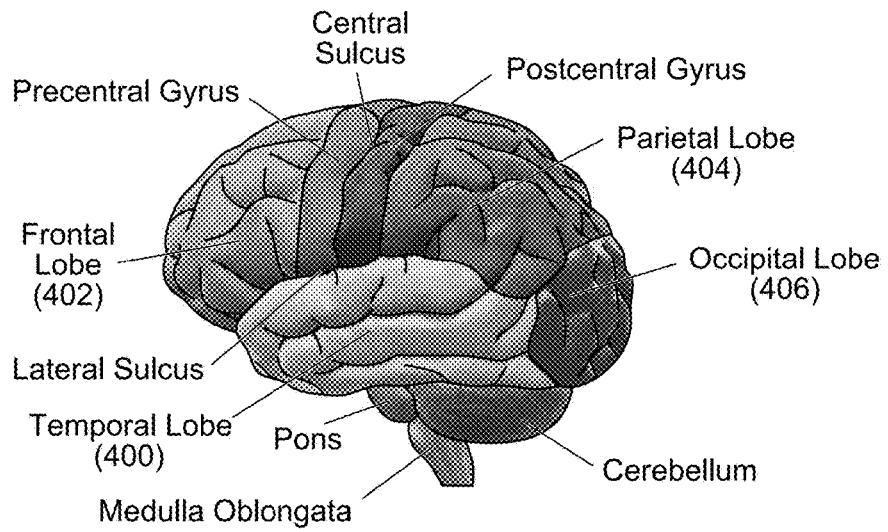
FIG. 4A shows an example of the brain, including its main anatomical features.

FIG. 4A shows an example of the brain, including its main anatomical features. In this example, the temporal lobe (400), frontal lobe (402), parietal lobe (404), and occipital lobe (406) are shown.

Figure 4B:
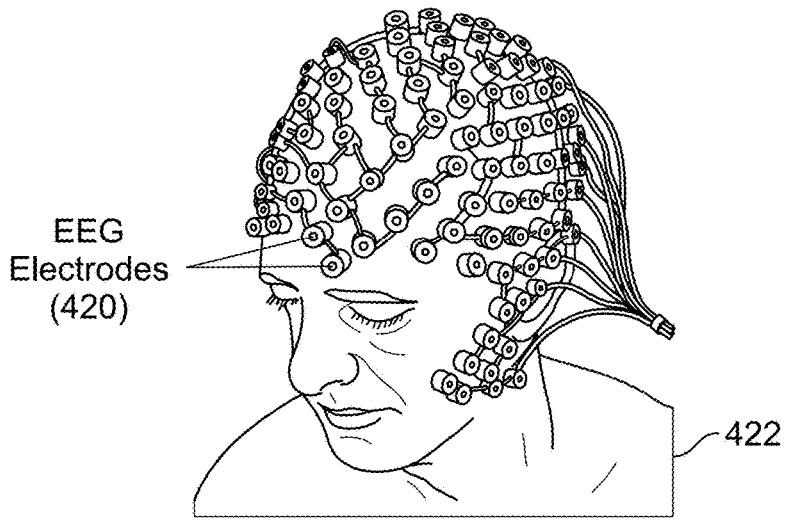
FIG. 4B shows an example of a recording device.

FIG. 4B shows an example of a recording device. In this example, EEG electrodes (420) are attached at various points to the scalp or skull of an EEG recording subject (422) to measure and record the electrical activity of the EEG recording subject's brain. Using EEG electrodes (420), an EEG recording (i.e., an electrogram) may be generated or otherwise obtained. The following figure shows an example of an EEG recording.

Figure 4C:
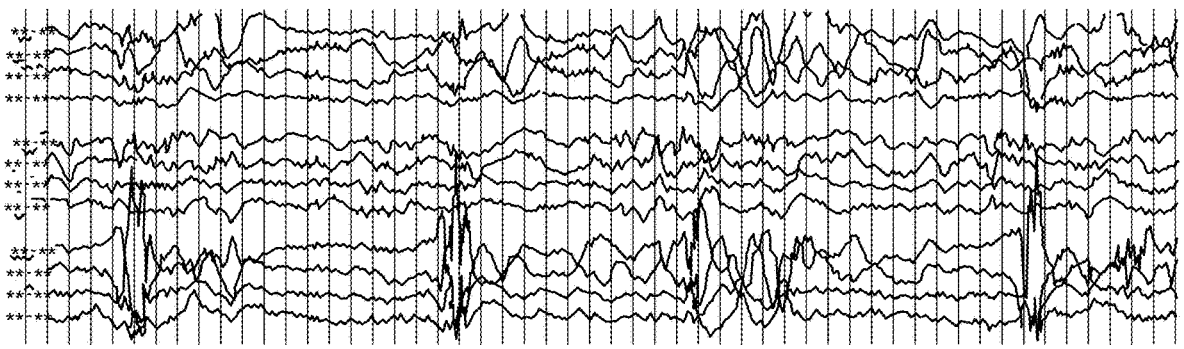
FIG. 4C shows an example subset of a multi-channel human EEG recording, visualized as an array of line plots.

FIG. 4C shows an example subset of a multi-channel human EEG recording, visualized as an array of line plots. In this example, the EEG recording (440) shown is in a partial montage format.

From the standpoint of studying and diagnosing epilepsy, every EEG recording channel can be segmented in the time domain into two types of signals:
1. ictal periods, corresponding to time intervals when seizures are occurring 2. interictal periods (IIPs), corresponding to time intervals between seizures There is debate in the scientific and clinical communities about exactly which temporal patterns within IIPs are most specific to epilepsy, rather than to other types of neuropathology, and thus how useful these signals are to accurate (i.e., simultaneously sensitive AND specific) diagnosis of epilepsy.

IIPs can be further segmented into two types of time intervals:
1. Interictal epileptiform events (IEEs or IIEEs)
2. Background (i.e., noise)

The term "background" is used to distinguish non-signal-containing IIP intervals from IEEs. Thus far, diagnostics based purely on currently identified IEEs demonstrate significantly worse performance compared to the diagnostic performance of direct seizure observations, in both laboratory and clinical contexts, thus necessitating the use of seizure observations in diagnosing epilepsy, both clinically and pre-clinically. Beyond diagnosing epilepsy, completely distinguishing all of background EEG (i.e., non-IEEs) from all of the various types of IEEs is still an open problem, due to the lack of a scientifically rigorous, quantitative, and comprehensive definition for IEEs based on experimental evidence.

In the broadest sense of the word, "noise" refers to anything that is not signal. Using this definition, the meaning of the term "noise" is equivalent to the meaning of the term "background," as it is used in the context of medical diagnosis using EEG data. From this perspective, temporal segmentation of recording periods that are "signal" (i.e., IEEs) from recording periods that are "noise" (i.e., background) is still an open problem in diagnosing epilepsy, which the techniques described herein help to solve. Beyond diagnosing epilepsy, segmenting a time series into periods of "noise" and periods of "signal" is of broad general interest in signal processing, including but not limited to neuromedical diagnostics such as epilepsy and other brain diseases (e.g. Alzheimer's, Parkinson's, traumatic brain injury, etc.). Data-driven machine learning technology enables the application-specific evidence-based segmentation of time series data (both scalar and vector) into signal and noise periods, along with a ranking of signal-containing data segments in terms of their signal content.

Previously identified types of IEEs have been subdivided into categories according to their morphogenic features (i.e. their waveform morphology) and the electrophysiological epiphenomena (i.e. waveform context) in which they occur, including but not limited to:
1. Interictal epileptiform activity (IEA or IIEA)
2. Interictal epileptiform discharges (IEDs or IIEDs)
3. Spike-wave discharges (SWDs)
4. Very fast oscillations (VFOs)

The simplest type of IEE is called a spike, which resembles an extracellular action potential in terms of its waveform morphology, but larger in amplitude and longer in duration, as if generated by many neurons firing together. Spikes are also referred to both as IEA and IED/IIED, depending on the author, and are the primary type of IEE used clinically in the diagnosis and treatment of epilepsy, including to aid surgical planning in patients with medically refractory focal epilepsy. Not all electrographic spikes represent IEEs or IEDs/IIEDs, complicating their interpretation and limiting their usefulness from clinical and pharmacological standpoints. Thus, there are different types of spikes, and there is debate in the scientific and clinical communities about what types of spikes are informative for epilepsy diagnosis and patient monitoring, and which constitute normal variation found in non-epileptic subjects.

It was hypothesized that seizures and epileptiform spikes, including IEA and IEDs/IIEDs, could be the tip of the proverbial iceberg in terms of the neuropathophysiology that occurs during epilepsy and searched for a way to distinguish or discriminate epilepsy from non-epilepsy using EEG data, in the absence of seizures. To accomplish this goal, a methodology for distinguishing IEEs from background in a statistically rigorous and data driven way was developed (some embodiments of which are described herein).

Literature research demonstrated a robust debate between different researchers and clinicians about which type of IEEs are the most indicative of epilepsy, and how to use different IEE types for diagnosis. A key, early goal was to help resolve this debate in a data-driven way, using the following methodological design guidelines:
1. Avoid making any assumptions about which types of IEEs are the most discriminative and reliable (i.e., valuable) for epilepsy diagnosis
2. Whenever such assumptions are not possible to eliminate, they should be minimized, e.g., via empirical cross-validated optimization techniques Initially, an automated process for detecting, sorting, and scoring spikes (e.g., to distinguish electrographic spikes from epileptiform spikes; to diagnose specific phenotypes from IIPs, the non-seizure portions of EEG recordings; and so on) was desired. Later, the concept of spikes was generalized to include any temporally-localizable electrographic shape, and developed a way of modeling the distributions of these shapes for each class or phenotype to be distinguished. This led to the term waveform shape analysis (WSA). Design iterations following the above guidelines led to the final form of the WSA electrographic quantification process, described in the next section. By identifying new types of IEEs in what was previously considered to be background, WSA provides a new and improved way of distinguishing background from IEEs in IIPs (i.e., non-seizure portions of EEG recordings).

The IEEs identified by WSA can occur in what was previously defined as background EEG, as well as in waveforms previously defined as IEA or IEDs/IIEDs. In the latter case, one of the main differences between the IEEs identified using WSA and those previously defined is their level of detail. Depending on the embodiment used, WSA enables more detailed dissection of waveform morphology compared to previously defined IEE types, (e.g., IEA/IIEA, IEDs/IIEDs, SWDs, VFOs, etc.). This distinguishes the IEEs defined by WSA technology from all previously-defined IEEs. WSA enables, but is not limited to, IEEs that are based on more fine-grain (microscopic) waveform morphologies, compared to previously defined types of IEEs, which are more coarse-grain (macroscopic) in their morphology. For example, a single spike may contain multiple IEEs as defined by WSA. These novel, fine-grain IEEs are unique to WSA, and enable more precise features to be extracted from EEG waveforms compared to existing approaches, such as spectral analyses, wavelet transforms, template matching algorithms, moving window-based feature extraction methods, and spike detection/counting/sorting algorithms. The enhanced precision afforded by the finer-grain waveform morphologies detected using WSA, compared to all other techniques, lead to improved diagnostic performance in time series data analysis applications including, but not limited to, epilepsy diagnosis.

As the Results section below details, WSA performance has been evaluated using both animal and human datasets covering a variety of electrode types and scan rates. Human recordings were selected from the Temple University EEG Corpus, a public domain set of annotated epilepsy-related datasets. Area under the curve of a receiver operating characteristic (AUC-ROC), which summarizes the separation or probability of separating two classes based on test results, was used as the primary performance measure.

Remarkably, WSA achieved an optimal performance value of AUC-ROC=1.0 (i.e., 100% separation) in all types of epilepsy data studied. Note that a perfect AUC-ROC score of 1.0 implies that an accuracy of 100% can be achieved for some fixed decision boundary. Also, a 100% diagnostic rate and 0% false positive rate can be simultaneously achieved for some fixed decision boundary, when AUC-ROC=1.0. In other words, an extremely high diagnostic-rate of 100% was simultaneously achieved while also maintaining an extremely low false-positive-rate of 0% across a variety of datasets having reasonably-large sample sizes.

These results are a significant improvement on current EEG analysis techniques used in all aspects of epilepsy related industries, in both preclinical and clinical spaces. Furthermore, since no specific epilepsy-related assumptions are made during the classifier training process, WSA is not an epilepsy-specific technique. The combination of strong performance and complete generality suggests that WSA will have utility in non-epilepsy indications. Example details of the WSA process are described next.

WSA Process

At its core, this exemplary WSA process leverages the combined power of three data analysis techniques:

Sparse temporal discretization (non-uniform spacing)
Shape feature extraction (localized in the time-domain)
Classification by various approaches (standard & proprietary)

Each of these methods contributes an important set of capabilities which, when appropriately combined, represent a novel methodology for time-series data analysis, which has been shown to be powerful enough to achieve certain diagnostic goals.

The simplest way to explain how WSA works is to document the code in terms of its procedural workflow and logic. Below is a high-level description of the processing steps involved in training the classification model i.e., the classifier. The classifier is the primary output of the process.

1. Before training the model, a training dataset consisting of EEG recordings from both positive and negative subjects, where "positive" indicates the phenotype to be detected (e.g., epilepsy), is prepared (including preprocessing steps). Typically, only two classes at a time are considered, leading to a binary classification problem. However, the following steps are not limited to binary classification problems, and they can also be applied to non-binary (multi-class) classification problems, although these have not been considered yet. Also, it is always possible to map a multi-class problem to a sequence of binary problems, by optimizing its binary encoding. Therefore, the following discussion is limited to binary problems for simplicity, without loss of generality.

1.1. Preprocessing steps include:
    1.1.1. Amplitude normalization with respect to a baseline level that is robustly estimated on a per-recording basis.
    1.1.2. Gaussian filtering using a moving window in the time domain (typically 12 milliseconds wide, i.e., plus or minus 6 milliseconds from a given time point).
    1.1.3. Optional preprocessing steps include:
    1.1.3.1. Drift correction (i.e., removal) using a median filter to estimate the drift, typically with a long duration window in the time domain, e.g., 800-1600 milliseconds.
    1.1.3.2. Drift correction/removal is performed if it significantly improves the classifier performance, which can be checked empirically.
    1.1.3.3. Drift correction can also be performed if there are visually obvious drift errors in the recordings, for example, in the first or last minute of each file.
    1.1.3.4. In addition to drift correction/removal, entire intervals of the recording can be removed from the analysis, based on manual or automated artifact detection, to reduce the likelihood of artifacts influencing the model predictions.
    1.1.3.5. Reference adjustment can be performed if the datasets to uniformize the datasets used for training and analysis. In many cases, recordings obtained from different clinical and research organizations will be acquired using different reference types. For example, one hospital may provide data calibrated using an average or linked-ear reference type, while another hospital may provide data referenced using a single electrode placed near the front of the skull. In order for the extracted shapes to be directly comparable, a common baseline must be established by adjusting the reference to remove the original calibration, and replace it with a new one. This can be done by subtracting a convex combination of one or more channels in the recording from each of the channels to be analyzed, e.g., the average across all channels can be subtracted from each of the channels used in the analysis, which will cancel out the original reference, and establish a new baseline that is uniform across all recordings used for training and running the model. It is important to emphasize that a common reference should be used for all data involved in training and running a given model.
    1.1.3.6. Resampling of a signal is sometimes performed, whereby the original scan rate is changed to a new scan rate (e.g., using linear or cubic spline interpolation). For example, all of the files in the training set should be resampled to the same rate in order to uniformize the training data in terms of its waveform shape statistics. Naturally, any subsequent recording evaluated after training a classifier should also be resampled to the same rate as that used for the recordings contained in the training set. Often, the smallest scan rate over all files in the training set is used for uniformization, typically around 200 Hz.
    1.1.3.7 Many EEG recordings contain additional recording channels from other modalities, beyond extracellular electric field potentials (e.g., electrocardiographic, electromyographic, magnetographic, and other peripheral signal types). Since WSA is not specific to one type of data such as EEG, these additional channels can optionally be included in the same way as are the EEG recording channels, depending on the needs of the application.

1.2. By sliding a shape detection function over S(t), the preprocessed time series data (voltage vs. time), non-uniformly spaced timepoints are sparsely selected for use as shape feature extraction loci (timepoints of interest).
    1.2.1. Although it is analogous, shape detection must be distinguished from sampling, whereby a continuous-time (analog) signal is converted into a discrete time signal, by measuring the signal function S(t) over a discrete set of time points, {t1, t2, . . . , tn}.
1.2.1.1. Sampling forms the basis of communication theory, as first described by Claude Shannon.
1.2.2. In sampling, the resulting set of discrete values {S(t1), S(t2), . . . , S(tn)} belongs to the same set of quantities as the original signal, in this case, voltage values.
1.2.3. Furthermore, the term sampling typically implies that the {ti}, i=1, . . . , n, are uniformly spaced, e.g., if t1=0, then ti=ci, where c is a constant whose duration equals the inverse scan-rate used by the uniform sampling process.
1.2.4. By contrast:
1.2.4.1. Shape detection does not evaluate the continuous-time function S(t) at discrete time points, and the temporal locations of the detected shapes t1, t2, . . . , tn are generally not uniformly spaced. i.e., ti+1−ti can be arbitrary.
1.2.4.2. In addition, shape detection does not evaluate the continuous-time time-series signal function S(t) at the detected times {ti}, i=1, . . . , n. Rather, it extracts a vector of features depending on the detected time point, which does not necessarily include S(ti), the value of the signal function at time ti.
1.2.4.3. Because it is used for digital signal processing, shape detection is performed on a signal after sampling has already occurred. I.e., shape detection is typically applied to the discrete-time (digital) version of a continuous-time (analog) signal, which has already been sampled. Therefore, sampling can be seen as a step that is performed during the measurement process, to convert an analog signal into a digital one, whereas shape detection occurs downstream from that. In other words, shape detection occurs after sampling has already been performed, on the sampled (digital, discrete-time) signal.
1.2.5. To summarize:
1.2.5.1. Sampling and shape detection are related and, in some sense, analogous, but they are not equivalent.
1.2.5.2. The purpose of sampling is to convert a continuous-time signal S(t), t∈[0, ∞)] into a discrete time signal {S(ti)}, i=1, . . . , n, where ti=ci are uniformly-spaced timepoints, for some constant c>0.
1.2.5.3. The purpose of shape detection is to extract statistically relevant waveform shape features from a signal that has already been sampled, localized around the non-uniformly-spaced timepoints {tj}, j=1, . . . , m, identified by shape detection functions according to criteria specific to each type of shape.
1.2.5.4. Shape detection is therefore a digital signal processing technique that is performed on a signal that has already been sampled, i.e., after it has been converted from analog (continuous time) to digital (discrete time).
1.2.5.5. The shape detection processing step does not specify what features of a signal are extracted at the time points indicated by the shape detection function, it only specifies where in time feature extraction is performed.
1.2.5.6. Shape features extracted from the waveform in the vicinity of the timepoints detected by the shape detection function may include, but do not necessarily need to include, the values of the signal at the detected timepoints S(tj), j=1, . . . , m.
1.3. For each detected time-domain locus or position, a vector of shape features is extracted using a shape feature extraction function. Each vector of shape features corresponds to a particular functional form, centered at the timepoints flagged by the detection function, which are used to represent the localized shape of the waveform, relative to the detected timepoint of interest or feature extraction locus. In other words, each detection function will be compatible with a specific set of shape features, and the resulting shape feature vector will usually be designed specifically for a particular detection function.
1.4. Because different subjects may have recording durations of different lengths, and varied numbers of recordings, the extracted shape features are stratified using uniform random subsampling on a per-subject basis. This ensures that each subject's data contributes an equal amount in terms of training the model.
1.5. These steps can be repeated using multiple shape detection functions, with different conditions for defining different classes of shapes.
1.5.1. In this example, there is an important constraint on the use of multiple shape detection functions: The temporal locations of the detected shapes must be non-overlapping between shape types. i.e., all of the time points detected for one shape type (detection function) must be distinct from those detected by all other shape types (detection functions). Another way to say this is that the sets of time points associated with each shape type are disjoint. Therefore, each time point corresponds to at most one shape. The reason for this constraint is to allow unambiguous interpretation of each shape detected, in terms of its temporal location with respect to the original EEG waveform.
1.5.2. For example, upward-pointing shapes representing a positive shift in electric field polarity can be taken as one shape class, and downward-pointing shapes representing a negative shift in the electric field's polarity can be taken as another shape class. These satisfy the non-overlapping constraint because mathematically, a local maximum and a local minimum of a scalar-valued function cannot both occur at a single point. In this case, the subsequent steps are repeated for each class of shapes, generating a set of models, with one model per shape class.
2. Once the training data are prepared, the shapes are detected, and the shape features for each shape type are extracted, then a feature matrix can be constructed, with rows corresponding to detected shapes and columns corresponding to extracted features.
2.1. At this point, any traditional supervised machine learning (classification) process can be directly applied, allowing a set of classifiers or models to be trained.
2.2. Currently, a probabilistic variant of WSA has been implemented, which may be called probabilistic analysis of waveform shapes (PAWS) using a non-naive Bayes classifier.
2.3. Other possible classifiers that could be used in place of a Bayes classifier include, but are not limited to:
2.3.1. k-Nearest-neighbor (kNN) classifier (and its kernelized variants)
2.3.2. Support vector machine (SVM) classifier (and its kernelized variants)
2.3.3. Discriminant classifier (linear/quadratic discriminant analysis & their regularized variants)
2.3.4. Logistic regression (& its regularized variants e.g., ridge-regularized logistic regression)
2.3.5. Random forest (ensemble method)
2.3.6. Artificial neural network model (e.g., Deep Learning)

2.3.7. Kernel methods (e.g., Gaussian Process regression)
2.3.8. Graph/network analyses (e.g., Markov fields or graph-valued representations)
2.3.9. Tensor/multilinear methods (e.g., matrix representations, matrix norms, distances).
2.4. PAWS is a special case of WSA. However, WSA is not dependent on the choice of classification method used, so the entire supervised machine learning toolbox may be applied for the subsequent steps. i.e., as described below, PAWS uses Bayes classifiers, but their use is not a requirement to run WSA.
2.5. The probabilistic models generated by PAWS can be combined by using fuzzy logic operations, e.g., AND, OR, and NOT, because of their probabilistic outputs.
2.6. Another useful feature of probabilistic models is the ability to apply the reject option. This is a technique whereby predictions that are not decisive enough in the probabilistic sense are rejected or ignored when computing the final classifier output score. Because of the probabilistic constraints on the classifier output, the rejection cutoff parameter used by the reject option can be directly interpreted, making it easier to set both interactively and semi-automatically.
2.7 Finally, another useful feature of probabilistic models is the notion of calibration, a type of performance measure specific for models whose outputs are probabilistic. Calibration considers how closely the classifier's output matches the true frequentist or Bayesian probabilities of a particular outcome.
3. The PAWS variant of WSA uses a probabilistic (Bayes) classifier. The probabilistic model's parameters are optimized by setting the density estimation sub-parameters defining a set of shape categories.
3.1. The parameters of the probabilistic model are derived from the probability estimates for each shape category for each class, considering them as separate mixture components of a mixture model for all shape categories of a given shape-type. Then, the posterior class (frequentist or Bayesian) probabilities are computed according to Bayes rule. Bayes classifiers are one of many probabilistic machine learning techniques. As noted above, they (i.e., Bayes classifiers) are a machine learning technique and are not necessarily associated with Bayesian statistics, which is an alternative to frequentist statistics and considers a new definition of probability in terms of the degree of belief of an outcome. Bayesian probability is different from the classical notion of frequentist probability, which is based on the limit of the relative frequencies of observed events, modeled by random variables, with the sample size going to infinity. The name "Bayes classifier" comes from Bayes rule, which applied to all probabilities, both frequentist and Bayesian, hence the need to clarify this terminology.
3.2. This type of classification process is called a "Bayes classifier," not to be confused with a "Naive Bayes classifier," which makes suboptimal independence assumptions. A "naive" approach is not used in at least some of the examples described herein (e.g., shape categories are based on a fully multidimensional domain decomposition, as opposed to the one-dimensional approach used by a Naive Bayes classifier).
3.2.1. Bayes optimality theorem: There is a theorem in machine learning which states that if the features are sufficient to capture all of the relevant statistics describing the two classes, and if the class-conditional probability density functions for each observable combination of features can be accurately estimated, then the resulting Bayes classifier has optimal decision boundaries. I.e., Bayes classifiers are optimal in this case, and therefore theoretically, no better machine learning model could exist.
3.2.2. In at least some cases, it is not certain or known that the features are sufficient and that probability estimates are perfectly accurate, so it cannot be claimed that classifiers are theoretically optimal. However, to the extent that the features can describe all relevant shapes, and to the extent that the probability estimates are sufficiently accurate, near-optimal classification performance can be expected for sufficiently descriptive features.
3.3. Based on the optimized model parameters, a set of models is generated with varied complexity in terms of their number of shape categories, and the model with the best performance is selected for robust evaluation.
3.4 The selection of which shape types and which shape features to use for each shape type can be automated by integrating these steps with feature space discretization.
4. The final model choice or selection is made based on a comparison of performance.
4.1. This selection depends on the choice of performance measure used.
4.2. One performance measure used is the area under the curve of a receiver operating characteristic is (AUC-ROC[6-7]), using a robust scoring scheme (e.g., a median over 15 or more random subsamples of shapes). AUC-ROC does not depend on a fixed decision boundary, which can be an advantage.
4.3. Other performance measures include the area under a precision-recall curve (AUC-PR), which also does not depend on a fixed decision boundary.
4.4. Most other performance measures are based on a fixed decision boundary, which allows a confusion matrix to be computed. Examples of confusion matrix-based performance measures include:
4.4.1. Diagnostic odds ratio
4.4.2. Accuracy=1−(error rate)
4.4.3. Balanced accuracy=(true positive rate+true negative rate)/2
4.4.4. Sensitivity a.k.a. recall a.k.a. true positive rate
4.4.5. Specificity a.k.a. true negative rate
4.4.6. F1 score
4.4.7. Fowlkes-Mallows index
4.4.8. Matthews correlation index
4.4.9. Jaccard index a.k.a. thread score a.k.a. critical success index
4.4.10. Markedness a.k.a. Youden's J statistic a.k.a. Informedness
4.4.11. G-mean, the geometric mean of sensitivity & specificity
4.4.12. Cohen's kappa
4.4.13 Positive predictive value a.k.a. precision
4.4.14 Negative predictive value
4.4.15 For probabilistic machine learning models including Bayes classifiers, the recently proposed CORP decomposition allows Bier-type score functions, which serve as performance measures for probabilistic models, to be considered as a sum of miscalibration, discrimination, and uncertainty terms. This allows probabilistic modeling errors to be quantified more critically and with greater precision, compared to non-probabilistic models.
4.5. Existing performance measures of discrimination listed above suffer from drawbacks such as non-robustness with respect to outliers (e.g., AUC-ROC and AUC-PR) or dependence on fixed decision boundaries. In some embodiments, (e.g., proprietary) performance measures based on a combination of the shift and the spread of the classifier scores are used for each class:

4.5.1. Shift can be defined as the distance between the median score of the positive class and the median score of the negative class.

4.5.2. Spread can be defined as the interquartile range of the scores for each class, or more generally, a confidence interval, e.g., a 90% confidence interval.

4.5.3. Using these definitions of shift and spread, the gap can be defined as the difference between the 25th percentile of the positive class and the 75th percentile of the negative class.

4.5.3.1. Similarly, some other confidence interval could be used, e.g., a 90% confidence interval.

4.5.3.2. Similarly, in the case of a 90% confidence interval, the gap would be computed as the difference between the 5th percentile of the positive class and the 95th percentile of the negative class.

4.5.4. From this gap definition, various performance measures can be defined:

4.5.4.1. The gap-to-shift ratio 4.5.4.2. The gap divided by the average spread 4.5.4.3. The gap plus the shift 4.5.4.4. The scaled gap plus the shift (a weighted gap measure)

4.5.4.5. A hybrid measure defined as some combination of the gap, the shift, and one of the other performance measures listed above, e.g., a product of AUC-ROC and shift.

4.6. The best performance measure to use for a given application can (and will) be determined empirically by running the entire hyperparameter optimization step for each choice of performance measure, and comparing the final test results of the resulting classifiers.

5. Steps 2 and 3 are repeated for each hyperparameter choice, e.g., using a multidimensional grid search.

5.1. The precise set of hyperparameters involved may vary depending on the type of classifier used.

5.1.1. In PAWS, one subset of the hyperparameters involves the acceptance region.

5.1.1.1. The acceptance region is defined as a hyper-rectangle in shape feature space.

5.1.1.2. This hyper-rectangle encloses all of the shapes that are considered acceptable.

5.1.1.3. By acceptable, it is meant that the shapes inside this region can be used for inference.

5.1.1.4. Shapes outside of the acceptance region are excluded from inference.

5.1.1.5. The purpose of the acceptance region is to remove portions of the feature space that are associated with weak or noisy signals.

5.1.1.6. Another reason to define the acceptance region is to prevent artifacts in the recording from influencing the classifier output.

5.1.1.7 The acceptance region can be further refined by removing some of the shape categories which are unreliable or do not provide sufficient diagnostic value.

5.2. Hyperparameter optimization can be repeated as many times as needed, or as computational resources and time constraints allow.

5.3. Sometimes, sufficient performance can be achieved after only one hyperparameter optimization run, even if all parameters do not converge.

5.4. The number of grid points scales exponentially with the number of hyperparameters that are simultaneously optimized. Therefore, it is advantageous to restrict any hyperparameters that can be fixed without significantly compromising performance, in order to reduce the number of grid points that are needed for each channel of data and shape class being considered.

5.5. Other possible ways of optimizing the hyperparameters include interior point methods, stochastic gradient descent approaches, trust region methods, semidefinite programming techniques, log-barrier and other homotopy methods for nonlinear optimization, simulated annealing and its robust variants such as packet annealing and particle methods, sequential quadratic programming (SQP), Metropolis Markov Chain Monte Carlo (MCMC) sampling techniques, etc.

5.6. In addition to the multidimensional grid search method, other global optimization methods can be used for the hyperparameter optimization step, such as Bayesian optimization, simulated annealing, and stochastic gradient descent.

6. The output of the process is a trained classifier for each shape detection function used, corresponding to the different shape classes or types. Currently, Bayes classifiers and two different types of detection functions are being used, but this may be expanded in the future. Also, some steps of the classifier training may be integrated across shape types, such as feature selection. For now, the classifiers operate on a per-shape basis, and a robust score estimation technique is used by taking the median of a random sample of shapes from each subject, using 15 or more samples. Then the robust score estimates for each type of detection function (i.e., shape class) are combined, e.g., using fuzzy logic operations (e.g., by taking the average positive class probability over all shape classes). Additional techniques for combining shape types include:

6.1. Simple summation of their scores, corresponding to the total odds provided by multiple tests with each shape considered as an independent process. Note that this is not a realistic assumption, from the standpoint of neurophysiology, since the same sets of electrophysiological processes are being observed by each recording channel for a given recording, assuming that the electrode positions are fixed at one point on the skull of the subject being recorded.

6.2. Weighted sums of scores, corresponding to linear score combinations, which can be optimized using regularized least squares (e.g., LASSO or L1-regularization for compressed sensing)

6.3. For probabilistic models (e.g., Bayes classifiers), products of non-redundant likelihood ratios can be used to compute a post-test odds of having a disease, which can be converted into a post-test probability of having a disease. This way, the interpretability of the classifier score is maximized, from the standpoint of a medical professional such as a clinician or an FDA regulator. If the tests being combined are redundant in the sense of having statistical outcomes that are strictly independent of each other, then the resulting post-test odds or probabilities of having or not having a disease will be miscalibrated, in the sense of having an erroneously high decisiveness for or against having the disease in question, compared to an accurate (i.e., calibrated) post-test odds or probability estimate.

6.4. Training a meta-classifier on the score vectors, corresponding to converting the classifier scores into meta-features.
6.5. Stepwise regression, where a subset of scores are combined via cross-validated (empirical) performance evaluation.
7. Once the models have been trained, they are typically used offline to compute robust score estimates for each subsequent recording to be analyzed. However, since they operate by scoring events on a per-shape basis, they can also be used in an on-line setting, e.g., in real-time by scoring every shape as it is detected in a streaming data buffer containing at least 500 milliseconds of recording time with a scan rate of at least 200 Hz.
8. Most data files created by a digital EEG recording device contain multiple channels of data, of which one or more contain per-electrode EEG signals across multiple electrodes, placed on different parts of the skull. For example, the international 10/20 system is a common approach for positioning an array of 19 electrodes. All of the above steps can be repeated for each channel of data used. Then, the optimal combination of channels can be found on a per-shape-type basis, before the final combination of model predictions across shape classes is made.
8.1. Optimizing the combinations of classifier outputs across channels can be achieved through exhaustive search for low channel numbers, or using a sparse optimization technique such as LASSO (L1-regularized least squares). It is possible to save time by re-using the hyperparameters obtained from a well-performing channel to hot-start the optimization of other channels, reducing the dimensionality of the grid search to be performed, by fixing some of the parameters.
8.2. An alternative approach is to combine shape features for a single shape type across channels. This is only appropriate if the shape feature distributions among a set of channels are highly similar. One way to evaluate the similarity of shape feature distributions across channels is to train a classifier on each one. If the resulting set of classifiers has highly similar parameters, then there is a high likelihood that the underlying shape feature distributions are not significantly different. Another possibility is to use a distance function on the space of probability distributions, such as the Hellinger distance or the Kullback-Leibler divergence. The EPE sequence and WSA methods directly extend to globally analyzing entire sequences of observed shapes across all channels, e.g., using a dynamical systems model with partially-observed superpositions of neurological states for each recording. This type of approach reduces the brain dynamics modeling problem to a filtering problem, in the sense of statistical signal processing (e.g., the Kalman filter, which can be seen as a type of hidden Markov model).
8.3. For 30 channels and 2 shape classes, for example, 60 models could be generated by executing the above steps, assuming no shape features were pooled across channels. Typically, fewer than 5 of these models are combined to achieve extremely high classification performance, such as the perfect 100% separation obtained thus far (AUC-ROC=1.0).
8.4 Another approach is to pool shape features for a single shape type across channels, effectively reducing the number of dimensions of the vector time series, increasing the sample size and reducing the number of resulting trained classifiers, at the expense of some loss of precision or discrimination of the corresponding mixture component probability distributions.
9. Planned extensions of the process include:
9.1. New shape types/classes, for instance, based on transformations of the raw data e.g., applying a linear operator such as taking the k-th derivative operation prior to running shape detection.
9.2. New feature types and new methods for feature selection. One example is a unified technique for ranking the various channel, shape type, and/or shape feature combinations during the classifier training process, allowing for channel, shape type, and/or shape feature selection to be completed in a single step, as part of classifier training.
9.3. Higher-order statistics based on pairs/doublets of shapes that are adjacent in time. This idea directly extends to triplets, quadruplets, and beyond (multiplets). This corresponds to a sequence representation of EEG data, analogous to DNA and other biological sequences. This can be called an "electrophysiological event (EPE)" sequence.
9.3.1. [redacted]
9.3.2. [redacted]
9.3.3. One method for implementing higher-order statistical analyses into the exemplary framework is to use Markov chain (discrete-state and discrete-time memoryless) models, which are defined with respect to a vector of state probabilities and a matrix of transition probabilities between all pairs of states.
9.3.3.1. From the standpoint of Markov chain models, the methodology described herein converts the EEG signal into a symbolic sequence, resembling a biological sequence (such as a DNA or protein sequence).
9.3.3.2. From this perspective, when using a non-naive Bayes probabilistic classifier trained on an appropriately-discretized feature space, the per-shape analysis described above can be interpreted as a special case of a Markov chain model involving sequences of length one.
9.3.3.3. Therefore, an extension of the per-shape methodology described above to higher-order temporal statistics is to estimate a transition probability matrix along with a shape category probability vector for each channel and shape type combination.
9.3.3.4. In terms of a Markov chain model, a sequence of length n can be constructed from each shape analyzed by looking ahead in time from that shape's position at the next n−1 shapes that occur inside of the acceptance region, following a given shape.
9.3.3.5. This sequence of transitions between shapes can be constructed both for each type of shape individually, and also across all shapes.
9.3.3.6. Using a Markov chain model, the likelihood of the transitions between the first shape and the next n−1 shapes in the sequence can be combined with the probability of the initial shape, by means of multiplication.
9.3.4. Another approach to incorporating higher-order temporal statistics and correlations into WSA is to empirically estimate the probabilities of all possible pairs, triplets, quadruplets, etc. without making the Markov assumption of a memoryless process.
9.3.4.1. While this "direct" approach is in principle more accurate and could perform better than the Markov chain modeling approach, it is more computationally complex, requiring more processing power compared to the Markov modeling approach.

9.3.4.2. Furthermore, this "direct" approach suffers from the curse of dimensionality, which Markov models avoid via the memoryless approximation that each transition only depends on the current state, not the previous history of states. By contrast, the number of possible states grows geometrically (exponentially) with the length of the temporal sequence, using the direct approach. This drawback significantly limits the maximum length of the temporal sequence that can be accurately evaluated using probabilistic methods using the direct approach, compared to the Markov modeling approach.

9.3.4.3. For short sequence lengths, the direct approach may provide better classification performance compared to Markov methods, because no limitations are imposed on the contributions of the past history of states (sequence of shape categories) on the subsequent transition to a new state (subsequent shape category).

9.3.4.4. In the limit of very large training sets, the limitations of the direct approach become less significant from the standpoint of maximizing estimation accuracy, since there is enough training data to adequately estimate the multiplet transition probabilities using empirical estimators, for sufficiently short sequences.

9.4. Spatial analysis: pairs/doublets of shapes that are adjacent in space in terms of coming from neighboring channels, extendable to triplets, quadruplets, and multiplets.

9.5. Shape acceptance likelihood: in some cases, there is a difference in the percentage of shapes that occur inside the acceptance region for each class. In this case, additional discriminatory power can be achieved by combining the odds of acceptance with the shape likelihood and transition (shape sequence) likelihoods. This is accomplished using a product of the likelihood ratios or equivalently a sum of the log likelihood ratios, which is the standard approach for combining the results of multiple diagnostic tests, to generate a final classification score 9.6. Shape prevalence: in most cases, the various shape categories defined by appropriate discretizing a non-naive Bayes classifier will have a wide range of different prevalences or relative rates of occurrence within a recording. This means that the observed relative rates or prevalences of each shape category in a new recording can be compared to those from the training set, and these can be combined with the likelihood ratios (i.e., diagnostic odds) corresponding to the shape categories themselves, as an additional piece of diagnostic evidence, using the diagnostic test combination framework based on updating the pre-test odds using products of likelihood ratios from each of the tests performed, in order to easily compute the post-test odds. The post-test odds for having the disease in question can then be easily converted into a post-test probability of having the disease, for the sake of interpretability by a medical professional such as a clinician (e.g., an epileptologist, in the case of diagnosing epilepsy).

9.7. Similarly, any other available diagnostic test results or pre-existing prior odds of having a disease, e.g., those obtained from any other probabilistic methods, can be combined with the classifier score using the same standard method of odds adjustment via multiplication of the preexisting odds by the likelihood ratio corresponding to the classifier score, to compute the adjusted odds of the positive class (e.g., epilepsy). For example, using a non-naive Bayes classifier trained on an appropriately-discretized feature space, each shape category (i.e. topologically connected subset of the feature space) can be treated as a diagnostic test with binary outcomes.

9.8. Eventually, as human EEG recordings record from multiple electrodes, a fully spatiotemporal shape classification could be considered to identify singlet, doublets, triplets, quadruplets, and multiplets across both space (as defined by the anatomical location of the electrode) and time. One way to accomplish this would be to use a higher-dimensional Markov process, such as a Markov field, a conditional random field, or a dynamic Bayes network. Another approach would be to globally analyze all shape category sequences, across all shape type and recording channel combinations, by treating them as partially-observed dynamical system states, where each channel of the recording observes a different subset of system (i.e. brain) states. In this situation, every detected shape corresponds to a superposition of an unknown number of neurophysiological states, each with their own nonstationary statistical properties. Therefore, WSA provides an approach to dynamical modeling of vector time series data based on a set of observations defined by the output of a supervised machine learning classifier training system.

Figure 5A:
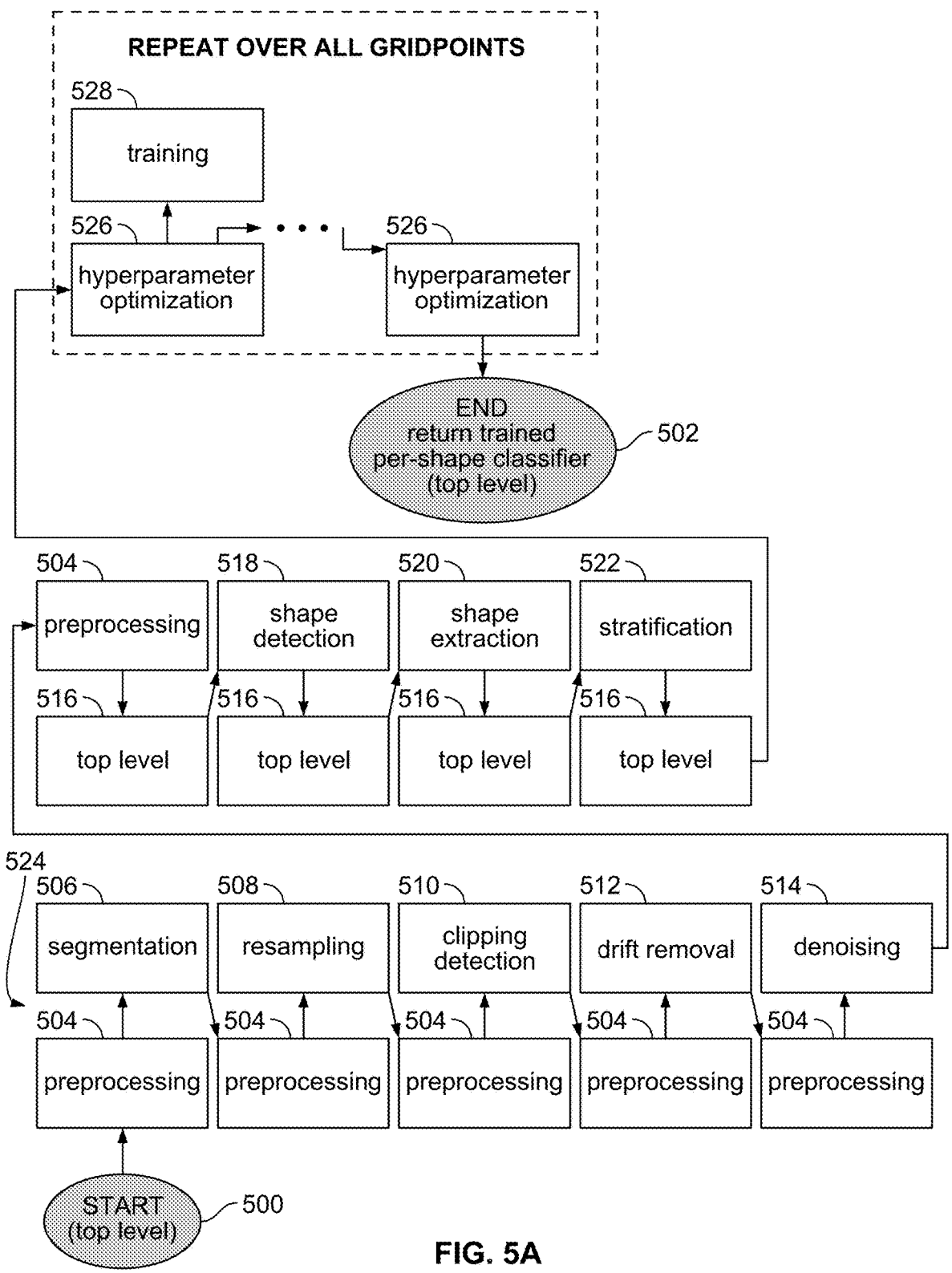
FIG. 5A shows an embodiment of an execution path diagram.

FIG. 5A shows an embodiment of an execution path diagram. In this example, the execution path is described below in terms of the (e.g., function) call-and-response structure of the (exemplary) implemented functions and/or modules. Each step of the outline above corresponds to one of the steps of the execution path shown by the diagram.

In this example, the execution path starts (e.g., at a top level of a program and/or hierarchy of function calls) at 500 and ends at 502 (e.g., at a top level of a program and/or hierarchy of function calls) where a trained (e.g., per-shape) classifier is output at 502. Each box represents a particular function currently being executed during the procedure. Each time a function is called, the vertical row position goes up, and each time a function returns a value the vertical row position goes down. For clarity and compactness, only high-level functions are shown in this diagram.

In this example, a preprocessing (504) module, function, and/or call includes sub-modules, sub-functions, and/or sub-calls of segmentation (506), resampling (508), clipping detection (510), drift removal (512), and denoising (514). After the start (500), the execution path calls preprocessing (504) which calls segmentation (506). After the segmentation (506) call or operation returns, the path goes to preprocessing (504) which than calls resampling (508). From there, the execution path continues as follows: preprocessing (504), clipping detection (510), preprocessing (504), drift removal (512), preprocessing (504), and denoising (514). To put it another way, the bottom row (524) corresponds to preprocessing and/or signal grooming.

After denoising (514), the path goes to preprocessing (504) and a top level (516). In this example, the top module (516) includes sub-modules, sub-functions, and/or sub-calls of shape detection (518), shape extraction (520), and stratification (522). From the top level (516), the execution path continues as follows: shape detection (518), top level (516), shape extraction (520), top level (516), stratification (522), and top level (516).

From there, the path goes to hyperparameter optimization (526) which calls training (528) (e.g., where the latter may be a sub-module, sub-function, and/or sub-call of the former). The hyperparameter optimization (526) and training calls (528) are repeated over all grid points before the end (502) of the exemplary path.

Figure 5B:
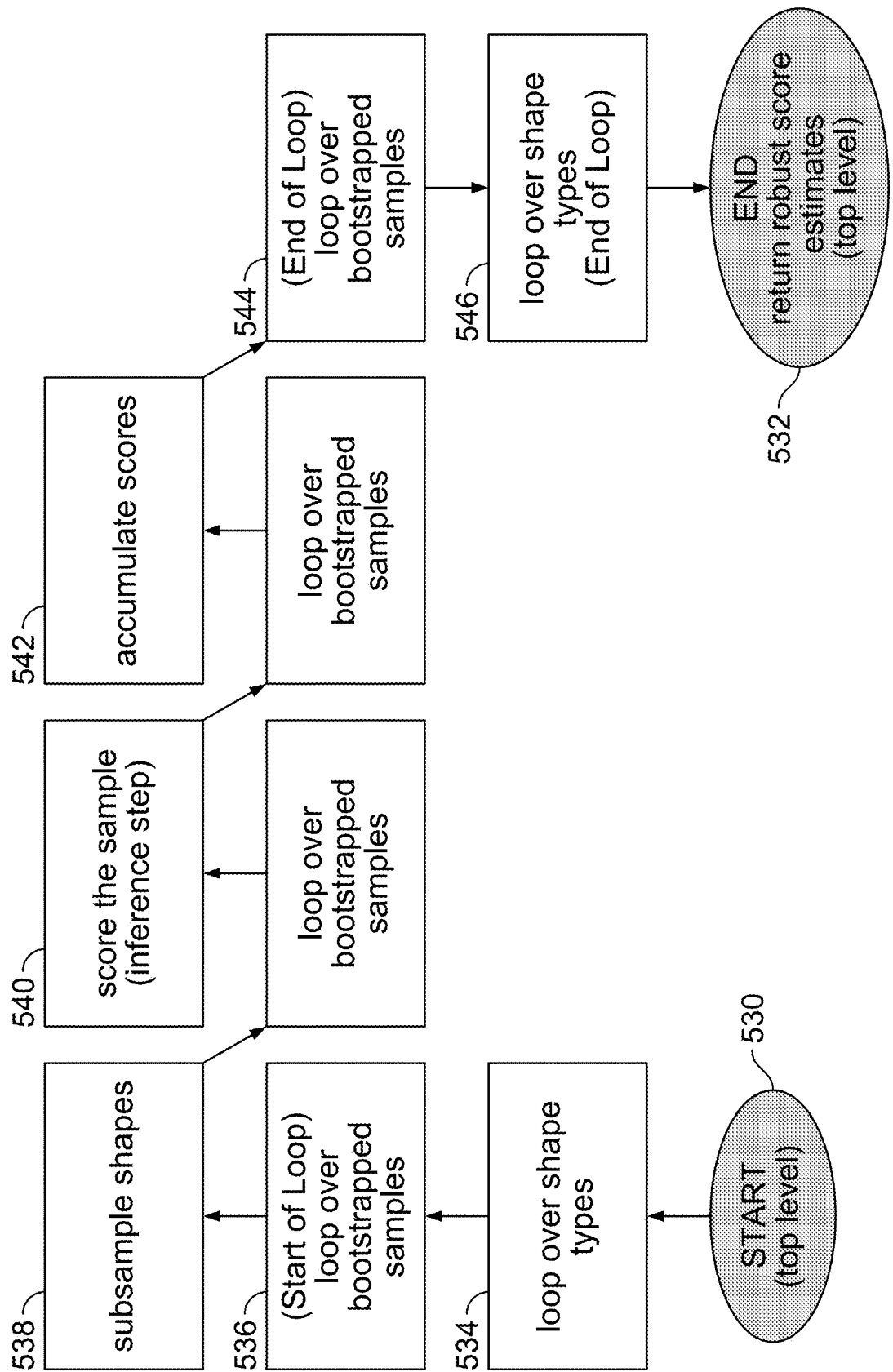
FIG. 5B shows an embodiment of an inference step (i.e., running the trained classifier to score a new recording, typically not part of the training set).

FIG. 5B shows an embodiment of an inference step (i.e., running the trained classifier to score a new recording, typically not part of the training set). In this example, in addition to the use of an acceptance region as described in item 5 of the WSA Process section, to further remove the influence of artifacts on the modeling pipeline, a bootstrapped median statistic is used during the inference step.

In this example, the inference step starts (530) at a top level and ends (532) at the top level, where robust score estimates are output at the end (532). The process begins with a loop over shape types (e.g., starting at 534 and ending at 546). Within the loop over shape types is another loop over bootstrapped samples (e.g., that starts at 536 and ends at 544). The loop over bootstrapped samples includes determining or otherwise obtaining subsample shapes (538), scoring the sample(s) (540) (i.e., the interference step), and accumulating scores (542).

Bootstrapped median calculation incorporates randomized subsampling of the extracted shape features across a number of bootstrap samples. In one example, 15 samples are used, each containing from 1000-100,000 shapes, depending on how long the shortest of the training recordings were. Since the classifier's hyperparameters are optimized for a value based on the recordings used in the training step, it is not always possible to use the same number of samples on the recording being analyzed during the inference step. In order to maintain the robustness property of the bootstrapped median score, there must be more shapes in the acceptance region than are sampled for each iteration of the bootstrap.

If more shapes are requested than are present in the acceptance region (e.g., for a very short recording), then the bootstrapped subsampling is not performed. This is equivalent to setting the bootstrap iteration limit to one. In this case, all of the extracted shapes inside the acceptance region are scored, and the final score is the result of a combination of per-shape scores. In this case, the final score is not based on a robust estimator such as the bootstrapped median. This means it is more sensitive to noise, artifacts, or other differences in the EEG recording that are not related to the signal to be detected (e.g., diagnosing epilepsy).

Implementation/Prototype

A protype was implemented in Matlab (version: 2022b). It consists of about 35 source code files with a total of about 2,300 lines of code. All of the training steps have been parallelized and vectorized for high performance computing. Currently, a 20-core Xeon machine (2 CPUs with 10 cores each) with 128 GB of RAM is being used.

Reading and preprocessing takes about 30 seconds or less per hour of recording, and hyperparameter optimization takes about 8 hours to complete the first grid search. The total hyperparameter runtime is indeterminate, as it depends on the number of grid search cycles needed to reach convergence or until time constraints are reached. Typically, it does not take more than 24 hours per shape class and recording channel, on a single compute node. In the end, one model per shape class is created, for each channel of data. The computational efficiency may depend on the choice of optimization method used for hyperparameter optimization. Therefore, several different hyperparameter optimization techniques can be implemented to allow the user of the machine learning system implementing WSA to select the one most appropriate for their modeling problem, depending on engineering constraints such as the available computational resources, the training dataset size, and the overall time available to complete the optimization.

Once the models have been trained, inference is done on a per-shape basis. Some shapes are not scored if they fall outside of the model's acceptance region. The acceptance region hyperparameters are optimized during the hyperparameter grid search (step 3, above). This amounts to a lookup of the shape category based on the extracted feature vector, and assignment of the stored probabilistic score value (in logarithmic Bayes Factor units). Since it is essentially just a series of lookup tables, inference on a per-shape basis is extremely fast.

Robust scoring can be achieved offline by bootstrapping a score distribution using random subsamples of shapes (typically about 10,000 shapes per sample), and then taking the median. This adds to the computational time needed to score each recording, but typically only takes about a minute on a single-core machine such as a laptop with an Intel Core-i7 6600U processor and 16 GB of RAM (2016 model).

All of the code has been written internally with no external dependencies other than standard Matlab built in functions. If desired, the code can be ported to a lower-level compiled programming language such as C. This way, the multi-threading capabilities, parallel processing, and compiler optimizations that are available using modern numerical computing libraries and hardware can be fully taken advantage of. If additional performance is desired, a GPU computing implementation may be used.

Results

Thus far, the performance of the classifier embodiments described above has usually been an optimal value of AUC-ROC=1.0, which is in excess of the FDA-approved performance measures for other diagnostic tests. The process has been tested on three different animal models and also on public-domain human data from the Temple University Hospital EEG corpus. In the case of the human data, AUC-ROC=1.0 was not achieved on a per-recording basis using a single channel model, but after combining the best pair of models for both shape classes (upward and downward), an AUC-ROC of 1.0 was achieved using these four models, whose scores were simply combined via an arithmetic mean (see FIGS. 8A-8C below for details).

Typical recording times used for the human study were 20-60 minutes long and achieved 100% accuracy. By contrast, it typically takes a week of recording time to achieve >75% accurate diagnoses in human patients with existing EEG analysis techniques.

A comparison was also performed against the classifier performance in electrographic recordings from TLE rats where seizures were kept in the recordings or manually removed (data not shown). In either case, a perfect AUC-ROC score of 1.0 was achieved, i.e., 100% separation of classes allowing 100% accuracy for some fixed decision boundary. This indicates that the classifier techniques described herein do not depend on or otherwise require having seizures occur during the recording in order to be highly accurate.

Figure 6:
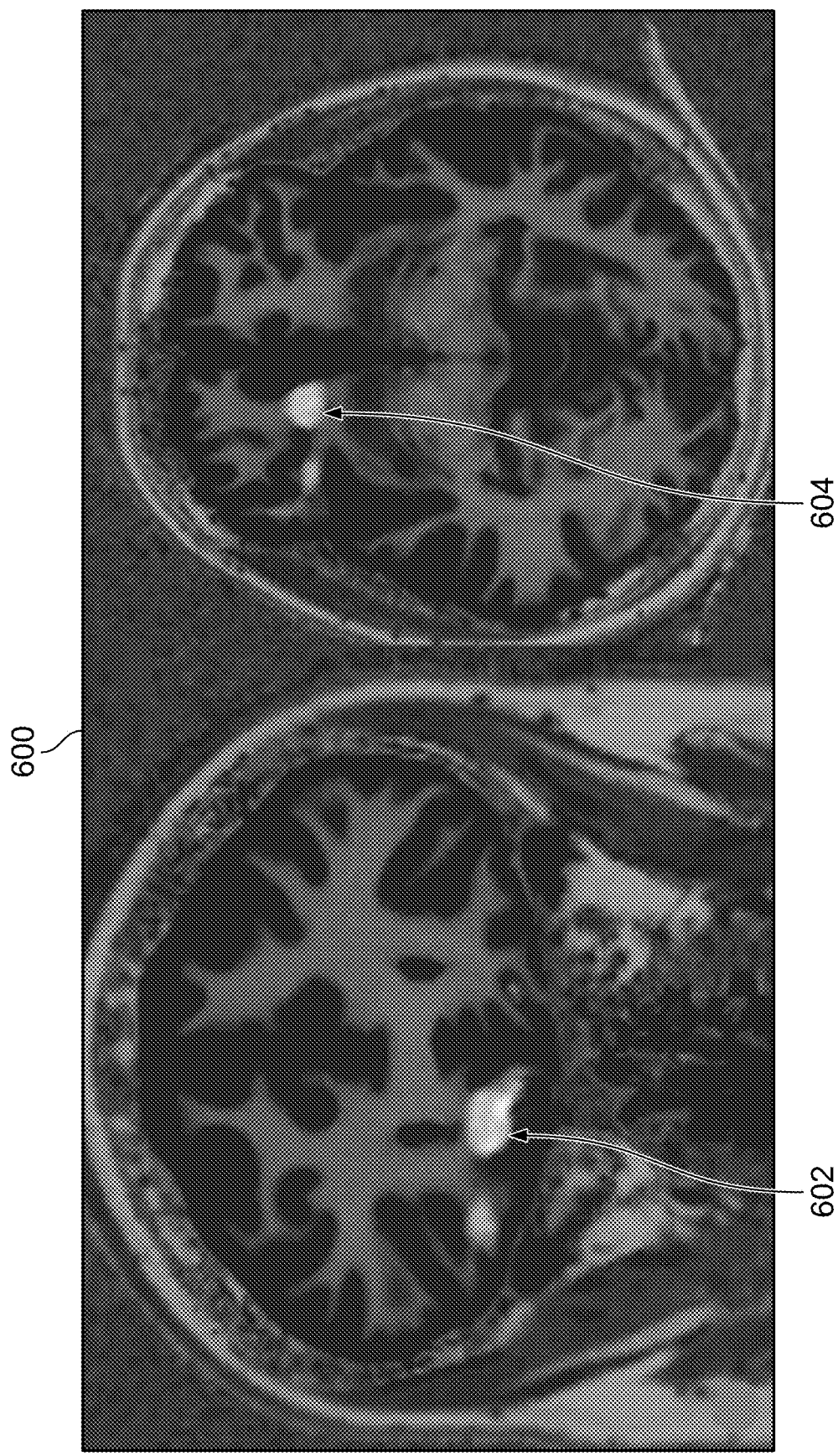
FIG. 6 shows an example of an MRI image of an FCD lesion in a human brain for illustrative purposes.

An early test of the WSA process was performed on animal models of focal cortical dysplasia (FCD). FIG. 6 shows an example of an MRI image of an FCD lesion in a human brain for illustrative purposes. In this example, the FCD (602 and 604) is shown as a whitish mass with the exemplar the MRI image (600). In some embodiments, WSA techniques are used to detect, diagnose, or treat conditions such as FCD.

After optimizing the hyperparameters for two different detection functions corresponding to positively and negatively polarized shapes, a total of 16 different shape categories was defined, 8 per shape-type (+/−). The most discriminative shape for detecting epilepsy corresponded to a probability of 96.47% of arising from the epileptic subjects. By contrast, the most discriminative shape for detecting a non-epileptic condition had a probability of only 51.5%. All test scores were computed using a different random sample of shapes compared to the ones used for training the model. The trained model was able to achieve 100% separation of all recordings in the study (see FIG. 7A).

FIG. 7A-7C show example early validation results using animal models showing perfect separation of epileptic and non-epileptic/control groups (AUC-ROC=1.0). FIG. 7A shows an example of focal cortical dysplasia (rat model, N=116). FIG. 7B shows an example of Temporal Lobe Epilepsy (rat model, N=21). FIG. 7C shows an example of Dravet syndrome (mouse model, N=16). In the examples of FIG. 7A-7C, classifier output scores are shown in logarithmic Bayes Factor units.

FIGS. 7B and 7C show similarly perfect AUC-ROC scores indicating complete separability between epileptic and non-epileptic subjects, based on two additional animal models: (4b) a model of temporal lobe epilepsy (TLE); and (4c) a model of Dravet syndrome, a genetically inherited form of epilepsy arising in the first year of childhood, caused by nonsense mutations in the Sodium channel protein type 1 subunit alpha (SCN1A) gene. In every case, the final model had on the order of 10 shape categories, indicating that highly discriminative shape features can be identified without resorting to large parameter numbers that indicate overfitting. This means that even without extending the model to consider spatiotemporal patterns, multiplet statistics, or higher-dimensional feature spaces, a strong signal for distinguishing between epilepsy and non-epilepsy is able to be robustly detected.

Figure 8A:
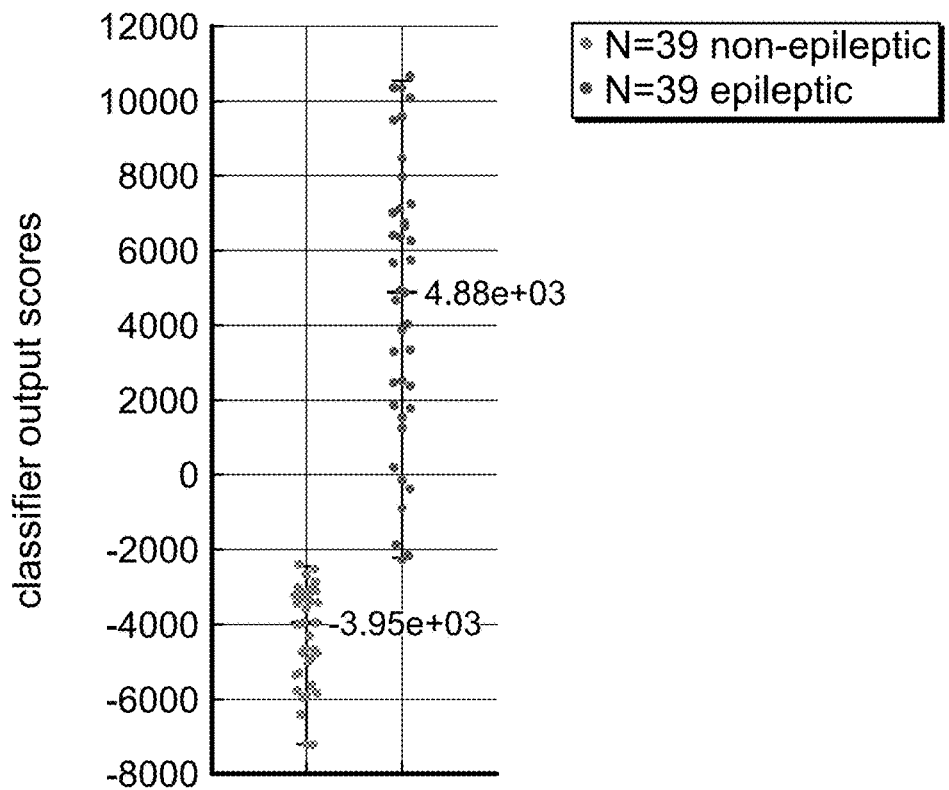
FIG. 8A shows an example of human EEG classification results.

More recently, similarly exceptional performance on public domain human EEG data downloaded from the Temple University Epilepsy Corpus (TUEC) has been achieved. After identifying all epileptic and non-epileptic patients with at least one recording with duration equal to or exceeding 23 minutes in length, a model is trained and scored as before, based on two shape types, positively and negatively polarized (+/−). Then, the best pair of channels for each shape-type (+/−) is picked. This gives four independently generated sets of scores, creating a final model based on two channels per shape-type (four channels total). This allows achievement of a perfect AUC-ROC score of 1.0, as shown in FIG. 8A. As before, all test scores were computed from a different subset of shapes compared to the ones used for training. The subset of shapes used for training and scoring was drawn at random uniformly across the recordings included in the dataset, greatly reducing the chance that the performance was affected by the presence of shapes specific to seizures.

Figure 8B:
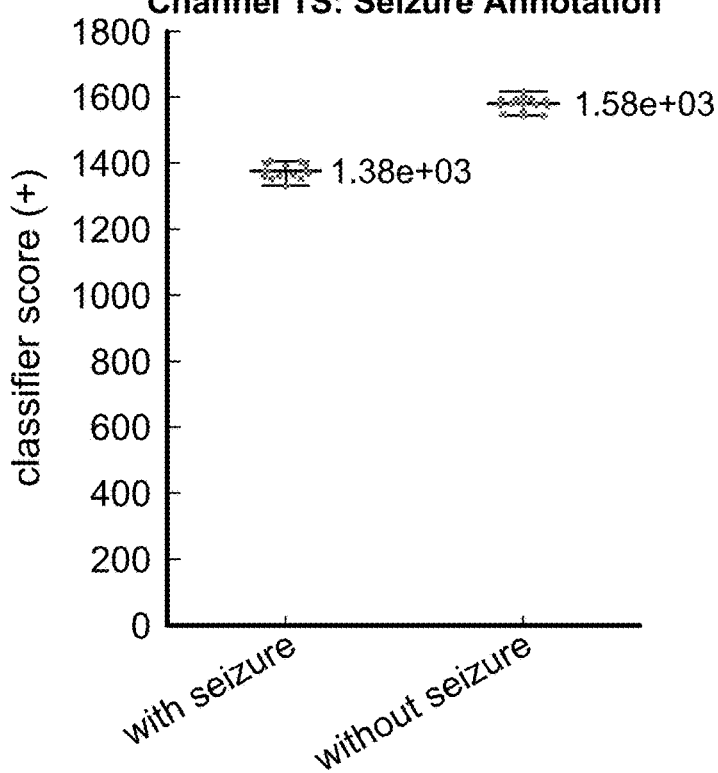
FIG. 8B shows an example evaluation of seizure removal effects on a single recording.

FIG. 8A shows an example of human EEG classification results. In this example graph, an AUC-ROC of 1.0 with 39 epileptic and 39 non-epileptic subjects (N=78) is shown. Data was obtained from the public-domain Temple University Epilepsy Corpus. FIG. 8B shows an example evaluation of seizure removal effects on a single recording. In this example, robust score estimates are based on 15 bootstrapped samples of 5000 positively-oriented shapes from channel T5 for a 67 year old female subject. Robust score estimates correspond to the median score over the bootstrapped samples. Diagnostic accuracy was not affected by the removal of seizures—in fact, the confidence of an epilepsy diagnosis increased after seizure removal, as indicated by the upward shift in the distribution of bootstrapped samples for the non-seizure group (at right). In FIGS. 8A and 8B, classifier output scores are shown in logarithmic Bayes Factor units.

To provide direct confirmation that diagnostic sensitivity was not affected by the presence of seizures in the recordings, trained classifier was tested on a new recording from a different dataset, which had all of the seizures manually annotated by expert epileptologists (Temple University Seizure Corpus). FIG. 8B shows the results of the robust scoring process with and without seizures included in the sample set, for a 67 year-old epileptic subject. Using a single channel (T5), robust score estimates were obtained from the median of a set of 15 uniformly sampled subsets of 5000 positively-oriented (+) shapes from the same file, first using the entire recording (at left), and then again after excluding all of the shapes that occurred during the expertly-annotated seizure regions (at right). In both cases, the classifier output score (logarithmic Bayes Factor units) was significantly larger than zero, indicating very high confidence for an epilepsy diagnosis. In fact, although the medians were shifted by excluding the seizure-containing portions of the recording, the score was higher for the non-seizure group (at right). This provides direct supporting evidence that the scores are not sensitive to the presence or exclusion of seizure events.

Conclusions

The shape analysis techniques described herein have demonstrated the highest possible levels of classification performance in all of the validation tests run so far, focusing on solving the problem of diagnosing epilepsy versus non-epilepsy from interictal periods (IIPs) of EEG data. Considering how innovative the approach is compared to traditional methods, it is encouraging to see that the original goals of quantifying IEEs, without making any a priori assumptions about which shapes (such as spikes) are the most powerful from the standpoint of their classification performance, have been achieved.

Applications

1. Useful applications within epilepsy.
  a. Diagnostic aid for epilepsy. Because WSA performs well in the absence of seizures, and can distinguish epileptic from non-epileptic subjects, it can be concluded that there is enough usable information or signal in IIPs to achieve high enough diagnostic performance to potentially obviate the need for direct observation of seizures. The current EEG analysis methods have a 70% failure rate in diagnosing epilepsy when analyzing the standard diagnostic 30 minute EEG12. When no diagnosis can be made, patients typically are analyzed by EEG recordings for up to a 7 day period at an Epilepsy Monitoring Unit (EMU). EMU stays are expensive, costing over $35,000, and also in high demand, so patients often must wait months for admission to an EMU. Additionally, there is a 30%-50% misdiagnosis rate for psychogenic seizures being diagnosed as epilepsy, in which case the non-epileptic patient is treated with ASM's17. The technology will improve diagnostic accuracy, reduce the time and effort to reach a diagnosis, and reduce misdiagnosis.
  b. Treatment identification and monitoring of epilepsy patients. Currently, determining patient response to specific drugs is trial and error, not a quantitative science. Over 30% of patients are pharmaco-resistant to some ASMs and there is no method to identify which ASMs a patient will be responsive to. Additionally, anti-seizure medicines (ASMs) have significant side effects, so finding the right medicine and dose for each patient is crucial. Using the technology described herein, a patient's classifier score can also be used as a measure of disease score, e.g., disease pathology. Measuring the patient disease score at different time points and before and after different treatment regimens provides a quantitative measure of the patient's disease burden and the patients response to treatment through time. Additionally, the classification techniques described herein can be used to identify pharmaco-resistant patients and predict patient response to different ASMs. This will help clinicians more quickly and accurately optimize their patients' drug therapy regimens and reduce the patients' exposure to unnecessary side-effects caused by ineffective therapies.

2. Useful applications outside of epilepsy. It is known from the literature that many CNS diseases, including but not limited to Alzheimer's, Parkinson's, Huntington's, traumatic brain injury (TBI), concussion, autism, multiple sclerosis and depression have abnormal EEGs. Unfortunately, there is no method to quantify this abnormality or to use this knowledge in a medically informative way. The technology can be applied to these brain diseases similarly as it is applied to epilepsy, e.g., for diagnosis and patient treatment identification and monitoring.

a. The work done in epilepsy suggests that a technique may have been uncovered for diagnosing and monitoring other brain diseases as well, including but not limited to Alzheimer's, Parkinson's, Huntington's, traumatic brain injury (TBI), concussion, autism, multiple sclerosis and depression.

b. In particular, some neurological diseases are known to clinically increase the risk of seizures, suggesting that these diseases share similar underlying neuropathophysiology with epilepsy. This shared neuropathophysiology suggests that the technology will have utility in these neurological diseases, examples of which include Alzheimer's, Parkinson's, Huntington's, multiple sclerosis, traumatic brain injury, and concussion.

c. Additionally, because of the flexibility in defining new types of shape classes and shape feature extraction methods, it is likely that this approach will work for diseases other than epilepsy or other diseases associated with seizures, which to date have not been accurately diagnosed using EEG recordings. Depression and autism are examples of these indications.

3. Useful applications to drug discovery. There are multiple applications of the technology in the drug discovery industry, from identifying new drug targets and new drugs, to helping guide all phases of drug development for brain diseases. Examples of these brain diseases include, but are not limited to, Alzheimer's, Parkinson's, Huntington's, traumatic brain injury (TBI), concussion, autism, multiple sclerosis and depression.

a. Identification of targets and new therapies for treating brain diseases. Importantly, the shapes identified by WSA as being most relatively enriched or depleted in the disease state, and/or most discriminatory between the diseases and no-diseased classes correspond to changes in physical electrochemical events occurring in the diseased brain. These electrochemical events may be the underlying cause of the disease and offer a target (or biomarker or assay readout) for identifying and developing more effective treatments for the disease.

b. The shapes identified by WSA can also be used as EEG biomarkers to:
      i. Reduce the time and cost for clinical trials by more rapidly identifying if patients are responding to an experimental therapy and also providing a larger efficacy signal, so fewer patients need to be recruited into clinical trials.
      ii. Establish efficacy, dose-response time-to-effect and washout time relationships of experimental drugs in all phases of drug development, from preclinical testing through Phase 3 trials.
      iii. Develop a companion diagnostic to identify which patients will respond best to an experimental therapy.
      iv. Rescue drugs that have failed in clinical trials by identifying the subset of patients that will have the best response to the previously-failed therapy.

4. Other applications
   a. Military applications include:
      i. Diagnosing and monitoring battlefield CNS trauma
      ii. Determining sleep status, recovery, and readiness of personnel to perform mentally demanding tasks, e.g., pilots
      iii. Enabling advanced human-machine/computer interfaces
      iv. Conducting neurological research on psychological states relevant for military performance, e.g., quantifying mental health issues affecting a significant number of military personnel, e.g., suicidal depression
      v. The medical arm of the military is also interested in basic neurological research, to better understand how the brain works, so that it can be better understand how to care for the specific needs of soldiers and veterans, both during and after their military service.

In summary, a valuable new method to use EEG data for patient diagnosis, monitoring, and treatment, as well as a potential method to discover more effective therapies in epilepsy and potentially other CNS indications has been developed. Additionally, this method is likely generalizable to other types of time series data as well.

Although epilepsy-related applications are the initial basis of the proof-of-concept results and prototyping efforts described herein, there is no clear end in sight in terms of the number of applications and the breakthrough potential of the WSA time series data analysis methodology described here, including EPE sequence analysis. Going beyond medical applications and non-pathological phenotype detection, it is possible to imagine applications of these probabilistic models for healthy people too. Brain-computer interfaces, robotics, monitoring, military, and consumer wearable devices are markets that may employ the techniques described herein. Digital biomarkers can be used for a variety of phenotyping tasks, as part of the digital health movement. Noninvasive sensing modalities such as EEG are ideal for a wide range of phenotyping applications, and as new sensing modalities are developed, the demand for digital biomarkers will continue to increase.

Also note that none of the training and inference steps of the WSA process are specific to EEG. Therefore, there is enormous potential for future work to generalize WSA to non-EEG time series data analysis problems, including machine learning and signal processing research, robotics, control systems, manufacturing, fault detection, cybersecurity, and communications.

Closed-Loop Applications

In various embodiments, closed-loop applications of WSA involve the deployment of a WSA module in (as an example) an implanted deep-brain stimulation (DBS) device or a responsive neurostimulation (RN) device, as part of a feedback control system. The term neurostimulation generally refers to electromagnetic approaches to neuromodulation. Some neurostimulation devices (NDs) are invasive in the sense that they require surgery to install, and are placed intracranially (i.e., inside the skull), either on the surface of the brain or deeper into the interior brain tissue. Noninvasive neurostimulation modalities are also available, such as transcranial magnetic stimulation and newly developed techniques such as temporal interference. Closed-loop feedback enables responsiveness in the stimulation parameters (such as pulse timing, current strength, and on/off control) which must be executed in real-time (i.e., sufficiently fast).

In various embodiments, closed-loop applications of WSA encompass both invasive and noninvasive NDs, without significant (e.g., technical) differences in terms of how a WSA module is coupled or otherwise integrated into the ND. Therefore, although examples of one type may be described below, the WSA-related techniques described herein are (in general) applicable to both invasive and noninvasive NDs. Closed-loop applications of WSA (e.g., invasive NDs or noninvasive NDs) may be used to treat and/or manage a variety of neurological diseases and/or conditions, (e.g., epilepsy, Parkinson's, tremor, and dystonia) or neuropsychiatric disorders (e.g., depression, obsessive-compulsive disorder, Tourette syndrome, chronic pain, and cluster headache).

In some RN applications, there are a number of stimulus parameters that are optimized in a closed-loop manner, in real-time, to achieve successful treatment outcomes. Successfully optimizing the stimulation parameters in real-time requires accurate closed-loop estimation of the current brain-state based on electrographic waveforms. Solving the brainstate estimation problem in real-time is important for closed-loop optimization of neurostimulation parameters.

WSA is well-suited for solving the brainstate estimation problem (e.g., within a closed-loop (e.g., treatment) device that uses WSA). Because of its data-driven design, WSA can be used to identify (e.g., predictive) biomarkers for detecting a particular brainstate of interest. For example, if the goal is to treat epilepsy by reducing seizure frequency and/or severity, then the automatic detection of brainstates associated with increased seizure propensity would be desirable. In such a scenario, WSA could be used to identify (e.g., predictive) biomarkers for brainstates that are indicators of hyperexcitability, which could be identified in a data-driven manner from a labeled training dataset, via machine learning.

In another example involving Parkinson's disease, neurostimulation (e.g., performed using a closed-loop (e.g., treatment) device that uses WSA) can be applied to reduce unwanted motor activity, such as tremors. In this context, the relevant state space would include states associated with abnormal motor activity. These are some examples of how particular brainstate space would be of interest for a particular disease or condition and WSA can be applied to that particular state space to identify relevant biomarkers (e.g., within a closed-loop (e.g., treatment) device).

The following figures illustrate various embodiments of a closed-loop system where the WSA module is implemented on a variety of devices.

Figure 9:
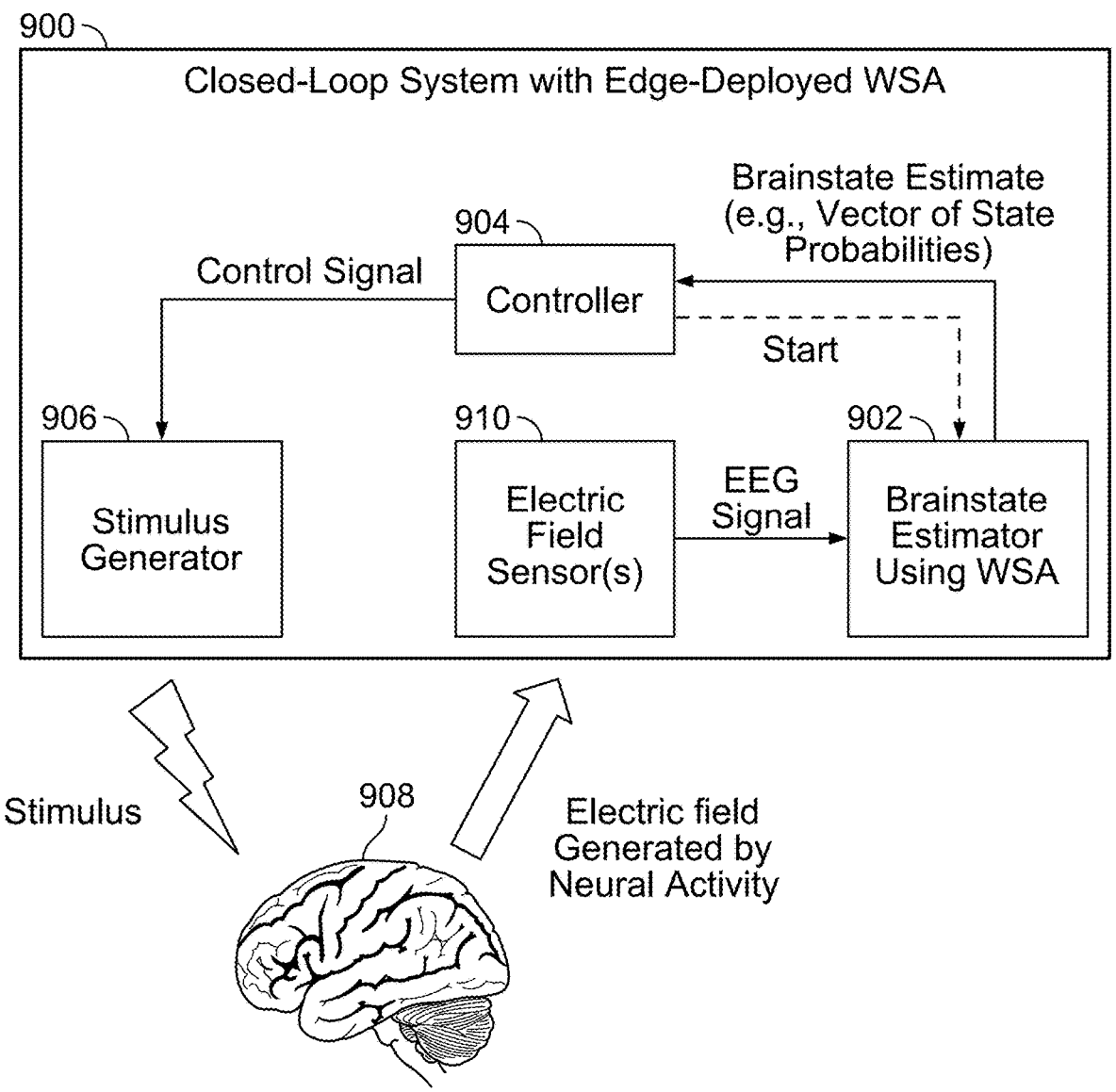
FIG. 9 is a diagram illustrating an embodiment of a closed-loop system with an edge-deployed WSA module.

FIG. 9 is a diagram illustrating an embodiment of a closed-loop system with an edge-deployed WSA module. In this example, a brainstate estimator that uses WSA (902) is included or otherwise embedded in the closed-loop system itself (900). A brainstate estimator is a state estimator that estimates the brainstate of the subject's brain (908); for brevity, the shorter "brainstate estimator" is used in this figure and other figures that follow.

In this example, the controller (904) outputs a control signal that controls a stimulus generator (906). This control signal is based on the brainstate estimate (e.g., in the form of a vector of state probabilities) that is output by the brainstate estimator with WSA (902). The stimulus generator (906), in response to the control signal, outputs (e.g., electrical) stimulus to the subject's brain (908). The neural activity of the brain (908), which is affected by the stimulus, generates an electric field which is measured by one or more electric field sensors (910). The electric field sensor(s) (910) output an EEG signal which is used by the brainstate estimator with WSA (902) to generate a (e.g., new or next) brainstate estimate.

In this example, in response to each call of the brainstate estimator with WSA (902), shapes are extracted from all recording channels (in this example, the EEG signal(s) received from the electric field sensor(s) (910)). The observed shape categories are then converted into a vector of probabilities for each of the states in the state space that has been defined for consideration (e.g., in a simple example, (1) an epileptic brainstate associated with an epileptic event or seizure vs. (2) a non-epileptic brainstate where there is no epileptic event or seizure).

In this example, the output of the brainstate estimator using WSA (902) is a vector of probabilistic, soft, and/or fuzzy state assignments where the vector sums to one (i.e., unity) which allows probabilistic interpretations. In some embodiments, when the brainstate estimator using WSA (902) is not sure which brainstate is currently active (e.g., whether the EEG signal being analyzed corresponds to an epileptic seizure or event, or not), all elements of the vector are set to equal values (i.e., a discrete uniform distribution). Otherwise, one of the state assignment values will be larger than the rest, allowing natural conversion to a crisp (binary) assignment value (i.e., a hard decision) if desired. In some other cases, fuzzy logic is applied to decide on whether to accept or reject an updated brainstate estimation result provided by the model, based on the certainty or decisiveness of the resulting vector of state assignments. For example, if two or more of the assignment values are within some small percentage of each other (e.g., one percent), then the estimate could be rejected as being too ambiguous to use for the basis of updating the stimulus control law. Alternatively, if such an ambiguity occurs within a cluster or group of brainstates having similar implications from a stimulus control standpoint, then the control unit might treat the prediction at a more coarse-grain level, appropriate for this collection of similar states.

In some embodiments, the controller (904) sends a start signal to the brainstate estimator (902) when a brainstate estimate is desired. It may be desirable to delay the start signal so that more of the EEG signal can be used, which in general improves the performance of the WSA processing and/or brainstate estimation. In some embodiments, depending upon the compute resources available, the latency requirements of the system (e.g., how soon after the start signal occurs the controller needs the brainstate estimate to be produced), and so on, a predefined start offset or start time is determined and is used to control the timing of when the start signal is asserted or otherwise set to TRUE (e.g., so that the start signal is asserted as late as possible so that more of the EEG signal can be used).

The specific timing requirements will depend upon the disease and/or application. For example, the estimation latency (e.g., between a start signal and when the brainstate estimate is output) may be between 100 ms and more than a day. In some embodiments, there is a minimum duration between stimulus events that must comply with safety requirements. For example, for some types of stimuli, applications at rates greater than once a day may be counterproductive and/or produce unwanted side-effects.

In some applications, a closed-loop system with an edge-deployed WSA module (such as 900) is desirable. For example, such a closed-loop system would not necessarily require clinic visits for treatment. And unlike embodiments which require a network and/or communication channel (some of which are described below), a closed-loop system with an edge-deployed WSA module (such as 900) could provide treatment even if a patient or user does not have network access (e.g., a multiday hiking or camping trip in a remote area with no cellular data network access).

Alternatively, in some other applications, a different implementation may be desired. The following figure shows an example of a closed-loop system that uses a mobile device.

Figure 10:
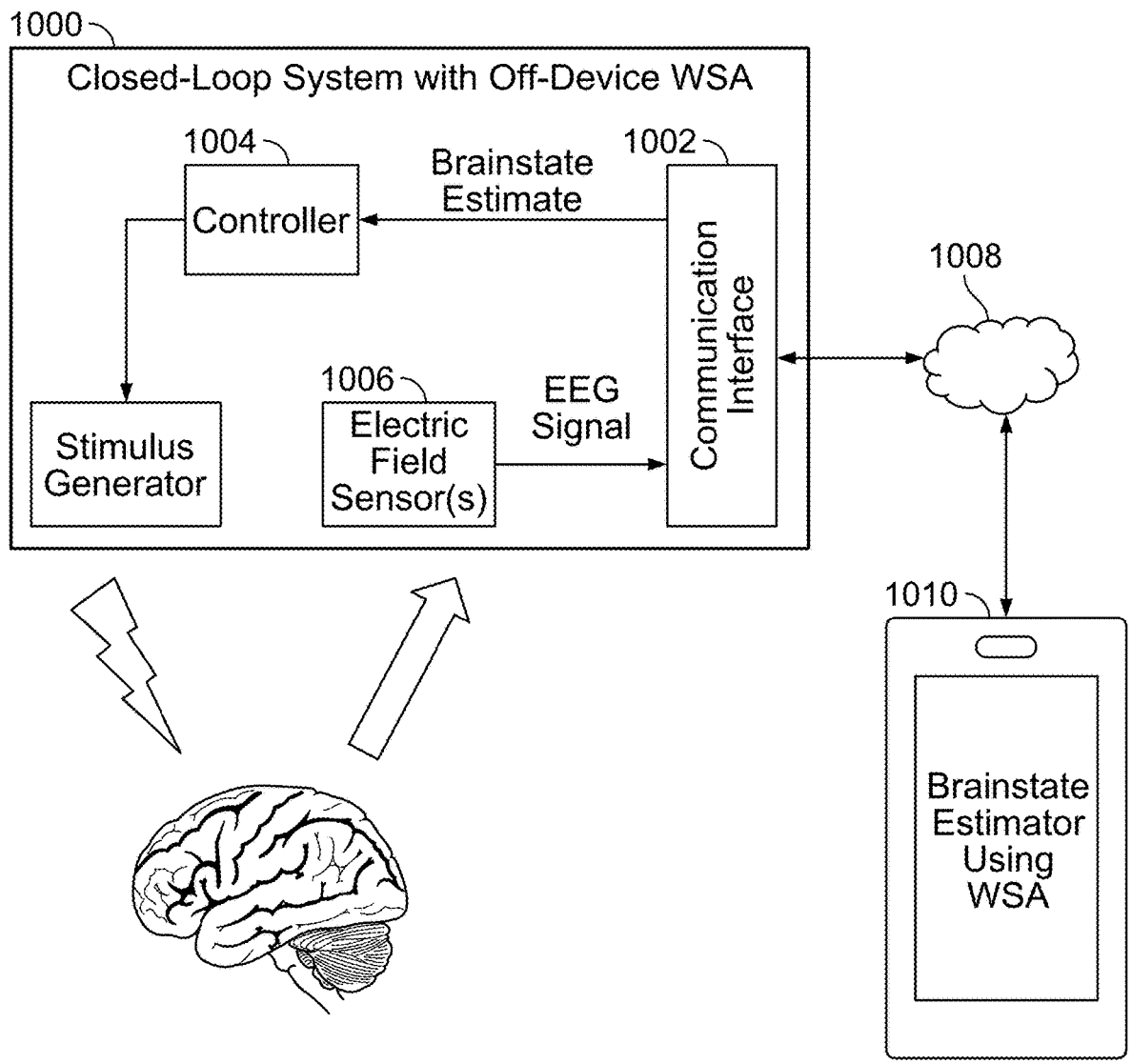
FIG. 10 is a diagram illustrating an embodiment of a closed-loop system with a brainstate estimator with WSA implemented on a mobile device.

FIG. 10 is a diagram illustrating an embodiment of a closed-loop system with a brainstate estimator with WSA implemented on a mobile device. For brevity, modules which were previously described in the previous example of FIG. 9 and which do not change substantially in this example are not described again. In this example, the closed-loop system (1000) includes a communication interface (1002) that outputs a brainstate estimate to the controller (1004) and inputs an EEG signal from the electric field sensor(s) (1006). The communication interface (1002) is connected to a network and/or communication channel (1008) which is also connected to a mobile device (1010). In various embodiments, the network and/or communication channel (1008) includes Bluetooth, WiFi, a cellular data network, etc. In various embodiments, the mobile device (1010) is a smartphone, tablet, laptop, etc.

In this example, the mobile device (1010) includes a brainstate estimator that uses WSA (e.g., implemented as a mobile app running on the mobile device). In this example, the brainstate estimator on the mobile device (1010) inputs the EEG signal received via the communication interface (1002) and the network and/or communication channel (1008) and returns a brainstate estimate via that path. Information may be exchanged over the network and/or communication channel (1008) in a variety of ways (e.g., push vs. pull, scheduled transmission windows of time vs. opportunistic, etc.).

The processing capability and processing resources of current mobile devices may surpass that of the closed-loop system (1000) and offer more readily available power, so it may be desirable to offload a brainstate estimator to a mobile device (1010). Current mobile devices offer greatly improved processing resources and/or capabilities compared to even a few years ago. However, in some applications, a mobile device (1010) may have insufficient and/or limiting processing resources and/or capabilities and a more powerful (e.g., hardware) platform is desired. The following figure shows one such example of this.

Figure 11:
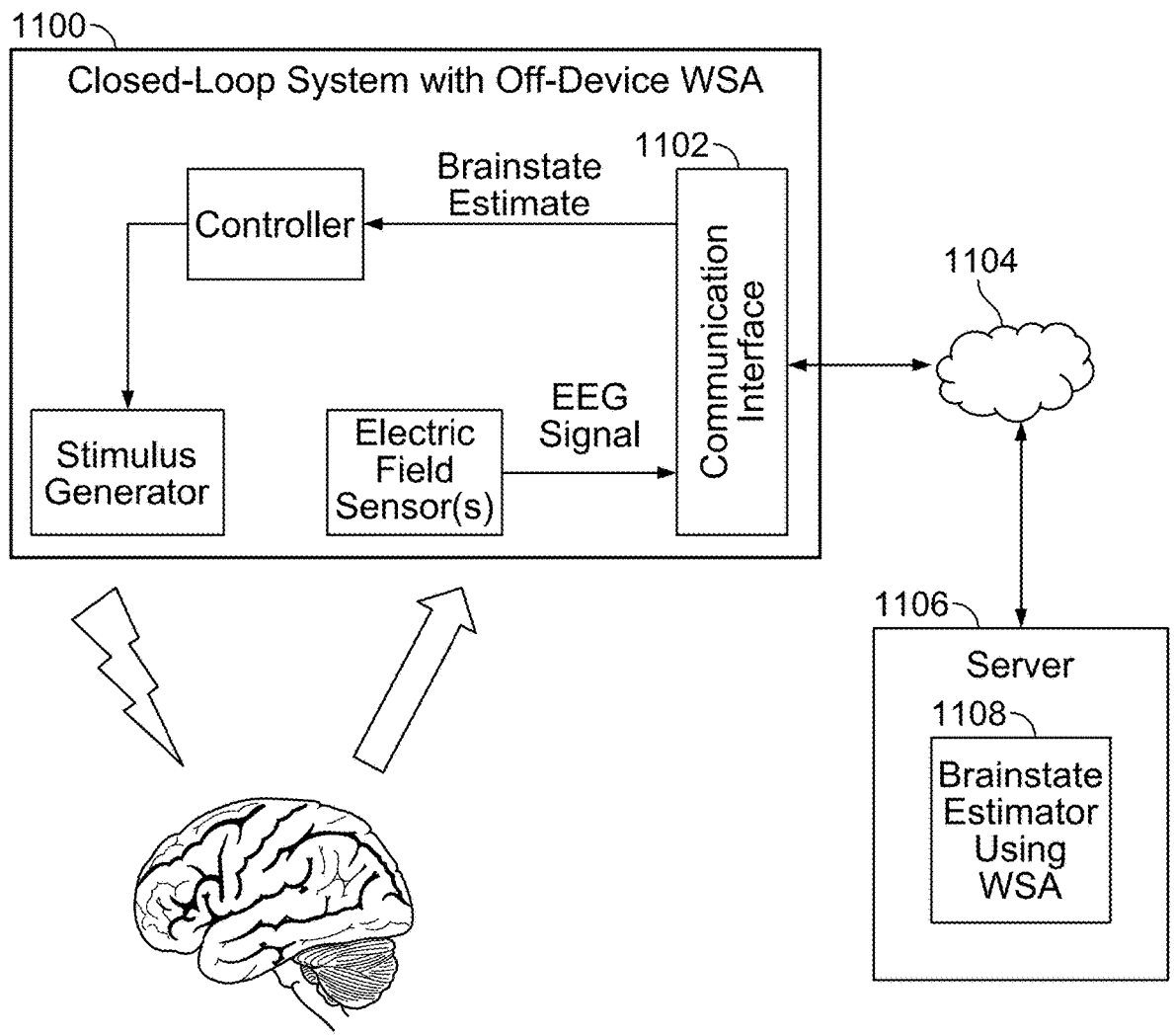
FIG. 11 is a diagram illustrating an embodiment of a closed-loop system with a brainstate estimator with WSA that is implemented on a server.

FIG. 11 is a diagram illustrating an embodiment of a closed-loop system with a brainstate estimator with WSA that is implemented on a server. In this example, the closed-loop system (1100) includes a communication interface (1102) that is connected to a server (1106) via a network and/or communication channel (1104). The server (1106) includes a brainstate estimator that uses WSA (1108). As described above, a server (e.g., 1106) may offer more processing and/or power resources compared to a mobile device (e.g., 1010 in FIG. 10), which may be desirable for more complicated and/or resource-intensive WSA iterations and/or if more frequent calls to a WSA module are needed.

The implementation examples described above are merely exemplary and are not intended to be limiting. In some embodiments, a hybrid approach is used where (as an example) some portion of the brainstate estimation and/or WSA processing is performed on-device (e.g., using an embedded software program that provides a subset of WSA tasks, processing, or operations) and another subset of WSA processing is performed off-device. For example, more complex, processing-intensive, and/or power hungry processing may be performed off-device. In another hybrid example, various divisions of (e.g., brainstate estimating and/or WSA) processing are distributed or split amongst three devices: at the edge (i.e., on the closed-loop (e.g., treatment) system), on a mobile device, and on a server (e.g., a backend device).

In some embodiments, a WSA module needs multiple recordings (e.g., recorded EEG signals) because the duration and/or amount of information contained in a given recording is insufficient (e.g., to estimate the brain state). The following figure shows an example where associated metadata is used to filter or select (e.g., EEG) recordings used together for a single WSA iteration or run.

Figure 12:
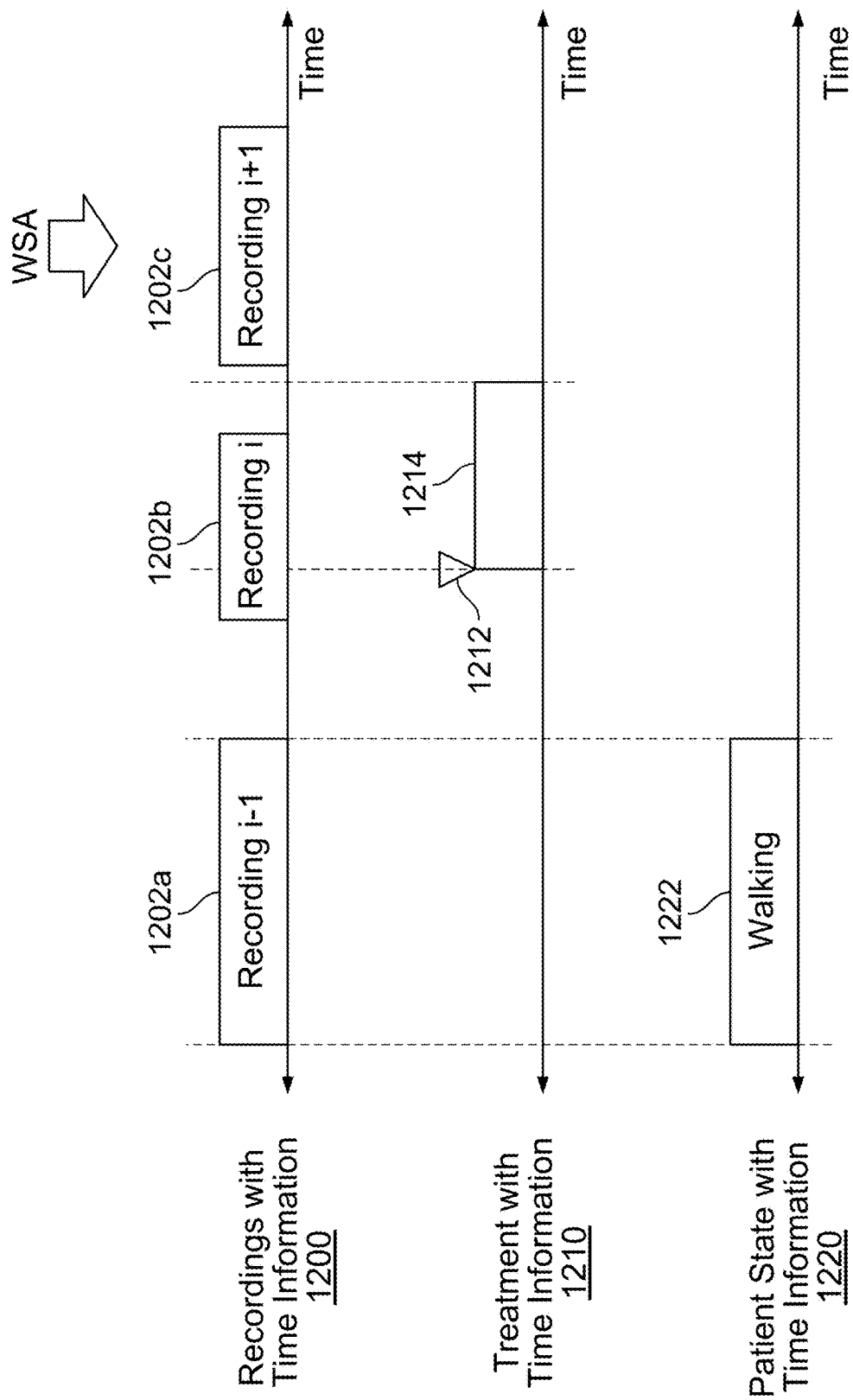
FIG. 12 is a diagram illustrating an embodiment of metadata with time information that is used to select which recordings to use together in a WSA iteration.

FIG. 12 is a diagram illustrating an embodiment of metadata with time information that is used to select which recordings to use together in a WSA iteration. In some embodiments, any of the closed-loop systems described in FIGS. 9-11 use this technique if more than one recording is needed to perform a WSA iteration or run. For simplicity and ease of explanation, suppose that the exemplary closed-loop system described in FIG. 9 performs the techniques shown here.

It is noted that in such a treatment-oriented application (e.g., where a single person or subject is of interest), only recordings from the subject are of interest and other recordings (i.e., recorded off of other people) are not acceptable and cannot be considered in order to satisfy a minimum time duration or minimum amount of data (e.g., needed to produce a quality brainstate estimate). To put it another way, some of the examples described above were training examples where it is desirable to use recordings from a variety of subjects, but in this treatment example, only one person or subject is of interest and so the pool of usable recordings shrinks significantly.

In this example, the top row (1200) shows the (e.g., EEG) recordings along a time axis that are recorded by the system (e.g., electric field sensor(s) (910) in FIG. 9). In this example, there is an $(i-1)^{th}$ recording (1202a), an $i^{th}$ recording (1202b), and an $(i+1)^{th}$ recording (1202c), each of which has associated time information (e.g., START_TIME_i_MINUS_1, END_TIME_i_MINUS_1, DURATION_i_MINUS_1, START_TIME_i, and so on).

In this example, suppose that a WSA process has been initiated (e.g., by controller (904) in FIG. 9) after and/or using the $(i+1)^{th}$ recording (1202c) but the duration and/or amount of information in that recording (1202c) is insufficient to make a brainstate estimate. Therefore, an earlier recording of the subject needs to also be ingested and to supplement the information in the $(i+1)^{th}$ recording (1202c) in order for the WSA module to have a relatively good quality estimate. In this example, metadata (e.g., side channel information, patient state information, etc.) is used to make this selection (e.g., so that a more accurate and/or better quality brainstate estimate is produced).

In this example, the middle row (1210) and bottom row (1220) show two examples of metadata that are used to select previous recordings to use to supplement a WSA iteration. The middle row (1210) shows treatment information where a treatment is initiated or applied at a start time (1212). After the start or application of the treatment (1212) is an aftereffect duration (1214) during which the treatment is assumed or known to linger in the patient and/or still affect the subject. Because the treatment information (1210) and recordings (1200) have associated time information, it is known that the exemplary aftereffect duration (1214) overlaps with the $i^{th}$ recording (1202b). Depending upon the application and/or brainstates being estimated, a recording (e.g., 1202b) that overlaps with an aftereffect and/or treatment duration (1214) is desirable and is used to supplement the WSA process. In other cases, a recording (e.g., 1202b) that overlaps with an aftereffect and/or treatment duration (1214) is undesirable and is not used to supplement the WSA process.

The bottom row (1220) shows a patient state, in this example, if the subject was walking. For example, a closed-loop system may perform a guided recording where the subject is instructed to walk (e.g., on a treadmill in a clinic setting, or outside of a clinic setting using a mobile app installed on a mobile device) so that a "walking" recording can be made. In some embodiments, a closed-loop system makes an estimate (e.g., using a brainstate estimator with WSA, or using some other module) about whether the subject (is believed to) be walking at a particular time and this is how the walking information (1222) is obtained.

In this example, the walking state or decision (1222) overlaps with the $(i-1)^{th}$ recording (1202a). Depending upon the application, a recording (e.g., 1202a) that was recorded while the subject was walking or moving may be desirable and so that recording (e.g., 1202a) is used to supplement the too-short recording (e.g., 1202c) and is ingested by a WSA module. Alternatively, a recording (e.g., 1202a) that was recorded while the subject was walking or moving is undesirable and is not used as a supplemental recording.

In this example, all of the information (e.g., 1200, 1210, and 1220) is timestamped, is annotated with time, and/or otherwise has time information. This allows the various information (e.g., 1200, 1210, and 1220) to be aligned or otherwise matched up, even if the information comes from different sources and/or with different arrival delays or latencies.

In some embodiments there is some maximum lag or maximum time interval so that recordings that are "too old" are not used to supplement a current and/or more recent recording. In some embodiments, more recent recordings are favored over older recordings (e.g., all other things being equal). The value of such a maximum may depend upon the disease and/or application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A closed-loop feedback system, comprising:
a brainstate estimator that generates a brainstate estimate of a subject's brain, including by:
detecting a peak shape in an electroencephalogram (EEG) signal in order to generate a plurality of detected peaks in the EEG signal;
obtaining a plurality of to-be-measured features that correspond to the peak shape, wherein the plurality of to-be-measured features includes an amplitude feature, a prominence feature, and a duration feature;
measuring the plurality of to-be-measured features from the plurality of detected peaks in the EEG signal in order to obtain a plurality of measured feature vectors, including by:
for a given detected peak in the plurality of detected peaks, analyzing a portion of the EEG signal that includes said given detected peak and excluding a rest of the EEG signal outside of said portion of the EEG signal; and
adding, to the plurality of measured feature vectors, a measured amplitude for said given detected peak, a measured prominence for said given detected peak, and a measured duration for said given detected peak, wherein a multidimensional space includes the plurality of measured feature vectors as a plurality of labeled points having locations within the multidimensional space;
classifying the EEG signal based at least in part on the locations of the plurality of labeled points in the multidimensional space, including by:
obtaining, for the multidimensional space, a plurality of totally disjoint regions that the multidimensional space is divided up into and a plurality of probabilities associated with the plurality of totally disjoint regions, wherein the multidimensional space includes a first axis that corresponds to the amplitude feature, a second axis that corresponds to the prominence feature, and a third axis that corresponds to the duration feature;
determining a combined value based at least in part on the locations of the plurality of labeled points within the multidimensional space, the plurality of totally disjoint regions, and the plurality of probabilities; and
classifying the EEG signal based at least in part on the combined value; and
generating, based at least in part on the classification of the EEG signal, the brainstate estimate;
outputting the brainstate estimate of the subject's brain;
a controller that generates a control signal based at least in part on the brainstate estimate of the subject's brain; and
a stimulus generator that generates a stimulus for the subject's brain based at least in part on the control signal.

2. The system recited in claim 1, wherein
the brainstate estimate includes a vector of state probabilities.

3. The system recited in claim 2, further including instructions for selecting a second EEG signal to supplement the EEG signal.

4. The system recited in claim 2, further including instructions for selecting a second EEG signal to supplement the EEG signal, including by using metadata with timing information, wherein the metadata includes one or more of the following: information associated with a treatment aftereffect or information associated with the subject moving.

5. The system recited in claim 1, wherein classifying the EEG signal includes classifying the EEG signal as epileptic or not epileptic.

6. The system recited in claim 1, wherein:
those regions in the plurality of totally disjoint regions that have an associated probability define an acceptance region;
those regions in the plurality of totally disjoint regions that do not have an associated probability are outside of the acceptance region; and
determining the combined value includes ignoring those labeled points in the plurality of labeled points with locations that fall outside of the acceptance region.

7. The system recited in claim 1, wherein:
the EEG signal is associated with measuring a response of a treatment to the subject of the closed-loop treatment system;
the brainstate estimator further selects a supplemental EEG signal in an event the EEG signal is too short;
the supplemental EEG signal is selected from one or more potential recordings associated with the subject and any potential recording that is associated with a subject other than the subject is ineligible to be the supplemental EEG signal; and
selecting the supplemental EEG signal is based at least in part on a comparison of an aftereffect duration, during which treatment by the closed-loop treatment system lingers in the subject, and time information associated with the one or more potential recordings associated with the subject.

8. The system recited in claim 1, wherein:
the EEG signal is associated with measuring a response of a treatment to the subject of the closed-loop treatment system;
the brainstate estimator further selects a supplemental EEG signal in an event the EEG signal is too short;
the supplemental EEG signal is selected from one or more potential recordings associated with the subject and any potential recording that is associated with a subject other than the subject is ineligible to be the supplemental EEG signal; and
selecting the supplemental EEG signal is based at least in part on a comparison of a period of movement, during which the subject was moving, and time information associated with the one or more potential recordings associated with the subject.

9. A method for operating a closed-loop feedback system, comprising:
generating a brainstate estimate of a subject's brain using a brainstate estimator in the closed-loop feedback system, including by:
detecting a peak shape in an electroencephalogram (EEG) signal in order to generate a plurality of detected peaks in the EEG signal;
obtaining a plurality of to-be-measured features that correspond to the peak shape, wherein the plurality of to-be-measured features includes an amplitude feature, a prominence feature, and a duration feature;
measuring the plurality of to-be-measured features from the plurality of detected peaks in the EEG signal in order to obtain a plurality of measured feature vectors, including by:
for a given detected peak in the plurality of detected peaks, analyzing a portion of the EEG signal that includes said given detected peak and excluding a rest of the EEG signal outside of said portion of the EEG signal; and
adding, to the plurality of measured feature vectors, a measured amplitude for said given detected peak, a measured prominence for said given detected peak, and a measured duration for said given detected peak, wherein a multidimensional space includes the plurality of measured feature vectors as a plurality of labeled points having locations within the multidimensional space;
classifying the EEG signal based at least in part on the locations of the plurality of labeled points in the multidimensional space, including by:
obtaining, for the multidimensional space, a plurality of totally disjoint regions that the multidimensional space is divided up into and a plurality of probabilities associated with the plurality of totally disjoint regions, wherein the multidimensional space includes a first axis that corresponds to the amplitude feature, a second axis that corresponds to the prominence feature, and a third axis that corresponds to the duration feature;
determining a combined value based at least in part on the locations of the plurality of labeled points within the multidimensional space, the plurality of totally disjoint regions, and the plurality of probabilities; and
classifying the EEG signal based at least in part on the combined value;
generating, based at least in part on the classification of the EEG signal, the brainstate estimate;
outputting the brainstate estimate of the subject's brain;
generating a control signal, using a controller in the closed-loop feedback system, based at least in part on the brainstate estimate of the subject's brain; and
generating a stimulus for the subject's brain, using a stimulus generator in the closed-loop feedback system, based at least in part on the control signal.

10. The method recited in claim 9, wherein
the brainstate estimate includes a vector of state probabilities; and
the method is performed by a device associated with the closed-loop treatment system.

11. The method recited in claim 10, wherein the device and the controller are included in a same edge device.

12. The method recited in claim 10, wherein the controller is included in an edge device and the device is included in a different device.

13. The method recited in claim 10, further including selecting a second EEG signal to supplement the EEG signal.

14. The method recited in claim 10, further including selecting a second EEG signal to supplement the EEG signal, including by using metadata with timing information, wherein the metadata includes one or more of the following: information associated with a treatment aftereffect or information associated with the subject moving.

15. The method recited in claim 9, wherein classifying the EEG signal includes classifying the EEG signal as epileptic or not epileptic.

16. The method recited in claim 9, wherein:
those regions in the plurality of totally disjoint regions that have an associated probability define an acceptance region;

those regions in the plurality of totally disjoint regions that do not have an associated probability are outside of the acceptance region; and determining the combined value includes ignoring those labeled points in the plurality of labeled points with locations that fall outside of the acceptance region.

17. The method recited in claim 9, wherein:

the EEG signal is associated with measuring a response of a treatment to the subject off the closed-loop treatment system;

the method further includes selecting a supplemental EEG signal in an event the EEG signal is too short;

the supplemental EEG signal is selected from one or more potential recordings associated with the subject and any potential recording that is associated with a subject other than the subject is ineligible to be the supplemental EEG signal; and selecting the supplemental EEG signal is based at least in part on a comparison of an aftereffect duration, during which treatment by the closed-loop treatment system lingers in the subject, and time information associated with the one or more potential recordings associated with the subject.

18. The method recited in claim 9, wherein:

the EEG signal is associated with measuring a response of a treatment to the subject of the closed-loop treatment system;

the method further includes selecting a supplemental EEG signal in an event the EEG signal is too short;

the supplemental EEG signal is selected from one or more potential recordings associated with the subject and any potential recording that is associated with a subject other than the subject is ineligible to be the supplemental EEG signal; and selecting the supplemental EEG signal is based at least in part on a comparison of a period of movement, during which the subject was moving, and time information associated with the one or more potential recordings associated with the subject.

* * * * *